US012300047B2

United States Patent
Trapani et al.

(10) Patent No.: US 12,300,047 B2
(45) Date of Patent: May 13, 2025

(54) HIGH-SECURITY ACCESS AND ALARM SYSTEM WITH ELECTRONIC DEADBOLT LOCKING DEVICE

(71) Applicant: Security Enhancement Systems, LLC, Northbrook, IL (US)

(72) Inventors: Matthew Frank Trapani, Deerfield, IL (US); Scott Trail, Northbrook, IL (US); Stephane Foisy, Udora (CA)

(73) Assignee: Security Enhancement Systems, LLC, Northbrook, IL (US)

( * ) Notice: Subject to any disclaimer, the term of this patent is extended or adjusted under 35 U.S.C. 154(b) by 124 days.

(21) Appl. No.: 18/131,754

(22) Filed: Apr. 6, 2023

(65) Prior Publication Data

US 2023/0326271 A1 Oct. 12, 2023

Related U.S. Application Data

(60) Provisional application No. 63/328,268, filed on Apr. 6, 2022.

(51) Int. Cl.
*G07C 9/00* (2020.01)
*H04W 76/10* (2018.01)

(52) U.S. Cl.
CPC ........ *G07C 9/00182* (2013.01); *H04W 76/10* (2018.02)

(58) Field of Classification Search
CPC .............. G07C 9/00182; H04W 76/10
(Continued)

(56) References Cited

U.S. PATENT DOCUMENTS

| | | | | |
|---|---|---|---|---|
| 6,161,005 A | * | 12/2000 | Pinzon | G08C 17/02 455/352 |
| 7,388,467 B2 | * | 6/2008 | Fisher | E05B 47/02 307/10.6 |

(Continued)

OTHER PUBLICATIONS

International Search Report, International application No. PCT/US23/17770. Date of mailing: Jul. 26, 2023. ISA/US, Alexandria, VA.

(Continued)

*Primary Examiner* — Zhen Y Wu
(74) *Attorney, Agent, or Firm* — Gregory Finch; Finch Paolino, LLC

(57) ABSTRACT

An electronic access control system comprising an electronic access control device that is communicably engaged with a local or remote alarm system via a networked communications interface. In accordance with certain embodiments, the electronic access control device may be operably engaged with the local or remote alarm system to send and receive one or more communication and execute one or more operations to (1) authenticate/authorize an access request from an authorized user, (2) suppress/disable a door intrusion alarm and (3) actuate the electronic access control device to unlock a door. In accordance with certain aspects of the present disclosure, the electronic access control system may be communicably engaged with one or more remote server, back-end data system, remote alarm system and/or electronic access control system to enable/enforce the interface between the electronic access control device and the local or remote alarm system.

20 Claims, 13 Drawing Sheets

(58) Field of Classification Search
USPC .................................................... 340/5.61
See application file for complete search history.

(56) References Cited

U.S. PATENT DOCUMENTS

| | | | | |
|---|---|---|---|---|
| 9,361,771 | B2* | 6/2016 | Comerford | E05B 47/0001 |
| 9,378,596 | B2* | 6/2016 | Shen | G07C 9/00174 |
| 9,771,737 | B1* | 9/2017 | Rais | E05B 19/0005 |
| 9,836,903 | B2* | 12/2017 | Comerford | E05B 47/0001 |
| 10,027,503 | B2* | 7/2018 | Patrick | H04N 21/43637 |
| 10,169,942 | B2* | 1/2019 | Comerford | E05B 45/04 |
| 10,176,687 | B2* | 1/2019 | Almomani | G08B 21/182 |
| 10,720,000 | B2* | 7/2020 | Comerford | E05B 65/00 |
| 11,193,309 | B1* | 12/2021 | Cabral Herrera | E05B 67/22 |
| 11,282,311 | B2* | 3/2022 | Comerford | E05B 45/06 |
| 2004/0145447 | A1* | 7/2004 | Yuhara | B60R 25/04 |
| | | | | 340/5.2 |
| 2008/0238669 | A1* | 10/2008 | Linford | G08B 13/08 |
| | | | | 340/542 |
| 2013/0335222 | A1* | 12/2013 | Comerford | E05B 65/00 |
| | | | | 340/542 |
| 2014/0340196 | A1* | 11/2014 | Myers | G07C 9/00309 |
| | | | | 340/5.61 |
| 2015/0211259 | A1* | 7/2015 | Dumas | G07C 9/28 |
| | | | | 340/5.61 |
| 2016/0049025 | A1* | 2/2016 | Johnson | G08B 13/19656 |
| | | | | 340/5.61 |
| 2016/0236652 | A1* | 8/2016 | Miyazawa | G08C 17/02 |
| 2017/0103647 | A1* | 4/2017 | Davis | H04W 12/068 |
| 2017/0161978 | A1* | 6/2017 | Wishne | G07F 17/14 |
| 2017/0178437 | A1* | 6/2017 | Ribas | G07C 9/00309 |
| 2018/0108196 | A1* | 4/2018 | Abner | G07C 9/00912 |
| 2018/0298639 | A1* | 10/2018 | Rais | E05B 47/0001 |
| 2021/0062543 | A1* | 3/2021 | Peng | E05B 47/0012 |
| 2022/0189228 | A1* | 6/2022 | Pirch | G07C 9/257 |

OTHER PUBLICATIONS

Written Opinion of the International Searching Authority, International application No. PCT/US23/17770. Date of mailing: Jul. 26, 2023. ISA/US, Alexandria, VA.

Greene, Lori, "Code Requirements for Doors with Access Control". Construction Specifier. Mar. 2013. 6 pages. Viewed online at https://www.constructionspecifier.com/code-requirements-for-doors-with-access-control/.

* cited by examiner

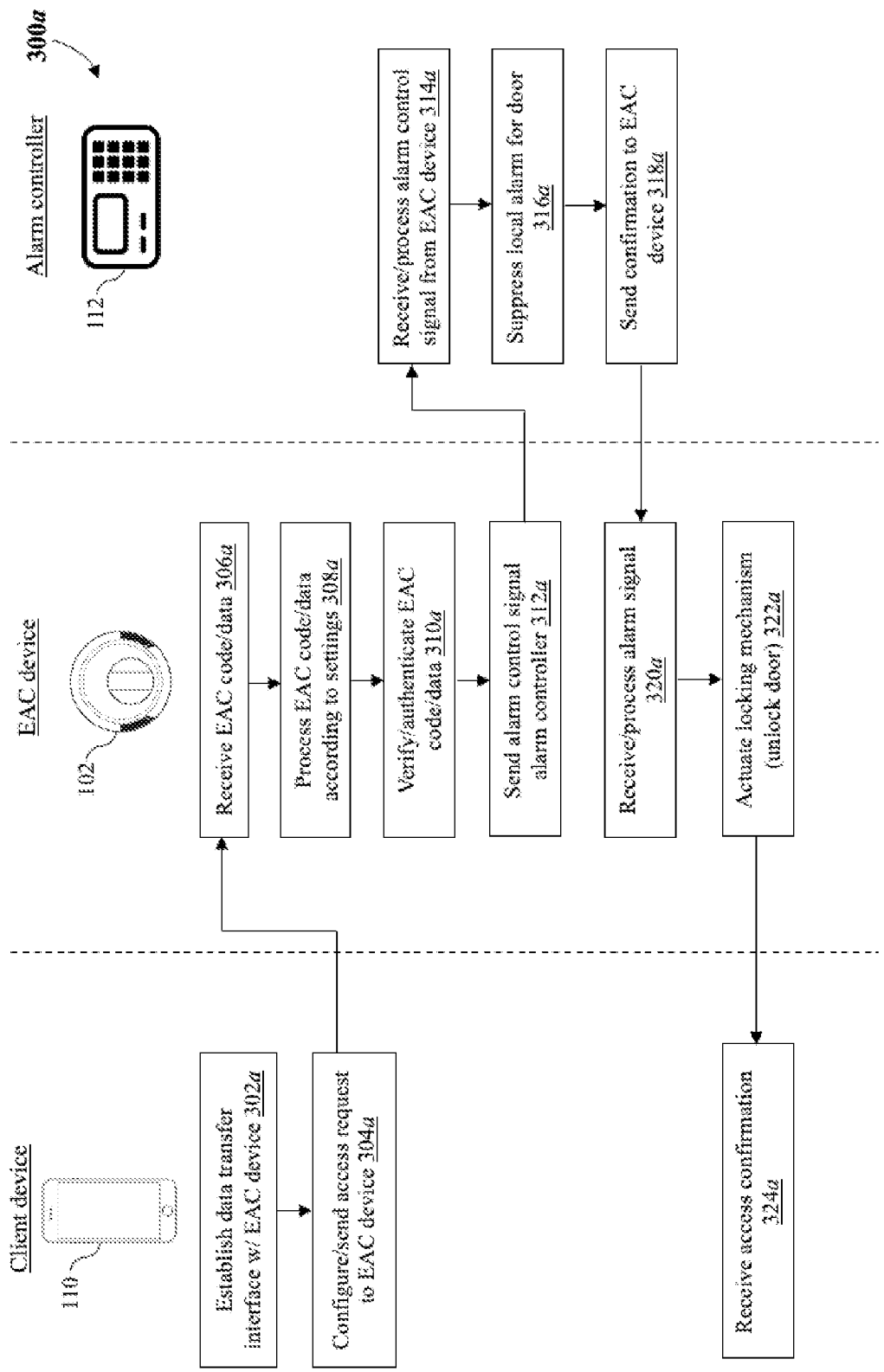

HIGH-SECURITY ACCESS AND ALARM SYSTEM WITH ELECTRONIC DEADBOLT LOCKING DEVICE

CROSS-REFERENCE TO RELATED APPLICATIONS

This application claims priority benefit of U.S. Provisional Application Ser. No. 63/328,268, filed Apr. 6, 2022, entitled "HIGH-SECURITY ACCESS AND ALARM SYSTEM WITH ELECTRONIC DEADBOLT LOCKING DEVICE"; the entirety of which is hereby incorporated herein at least by virtue of this reference.

FIELD

The present disclosure relates to the field of electronic locking devices and system; in particular, an enhanced security access and alarm system with an electronic deadbolt locking device.

BACKGROUND

Electronic locks comprise a variety of locking devices that operate by means of magnets, solenoids, and/or motors to actuate a locking mechanism by either supplying or removing an electric current to one or more components of the electronic lock. Electric locks are sometimes stand-alone with an electronic control assembly mounted directly to the lock. Electric locks may be incorporated within an electronic access control (EAC) system. Certain advantages of electronic locks include simplified key control and management (e.g., keys can be added and removed without re-keying the lock cylinder); fine access control (e.g., time and place conditions for access); and transaction logging (e.g., tracking and storing access events and device activity). Electronic locks can also be remotely monitored and controlled, both to lock and to unlock.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for an electronic access control system comprising an electronic locking device configured to selectively secure a door or an access point of an enclosure. The electronic locking device may comprise at least one locking mechanism and at least one electronic actuator configured to actuate the at least one locking mechanism between a locked position and an unlocked position; a controller communicably engaged with the at least one electronic actuator to command the at least one electronic actuator to perform at least one action; and at least one sensor communicably engaged with the controller. The controller may comprise a wireless communication module configured to establish a wireless data transfer interface with at least one mobile electronic device. In certain embodiments, the at least one sensor is configured to detect a position or a movement of the door or the access point of the enclosure. In certain embodiments, the controller comprises at least one processor and a non-transitory computer readable memory device comprising instructions stored thereon that, when executed by the at least one processor, command the at least one processor to perform one or more operations. In accordance with certain aspects of the present disclosure, the one or more operations may comprise one or more operations for establishing the wireless data transfer interface with the at least one mobile electronic device; receiving electronic access code data from the at least one mobile electronic device via the wireless data transfer interface; processing the electronic access code data according to one or more electronic access control settings to verify at least one electronic access code for the electronic locking device; communicating, in response to successfully verifying the at least one electronic access code, a first signal to at least one alarm system controller or remote server; and commanding, in response to communicating the first signal, the at least one electronic actuator to actuate the at least one locking mechanism from the locked position to the unlocked position. The at least one alarm system controller or remote server may be configured to suppress a local alarm for the door or the access point of the enclosure in response to the first signal.

In accordance with certain embodiments, the one or more operations of the processor may further comprise operations for determining at least one state of the electronic locking device according to a state machine model in response to receiving the electronic access code data from the at least one mobile electronic device. The one or more operations of the processor may further comprise operations for receiving at least one sensor input from the at least one sensor. The one or more operations of the processor may further comprise operations for determining at least one state of the electronic locking device according to a state machine model in response to the at least one sensor input. The one or more operations of the processor may further comprise operations for communicating a second signal to the at least one alarm system controller or remote server in response to determining the at least one state of the electronic locking device. In certain embodiments, the at least one alarm system controller or remote server is configured to engage the local alarm for the door or the access point of the enclosure in response to the second signal. The one or more operations of the processor may further comprise operations for transitioning the at least one state of the electronic locking device according to the state machine model in response to the at least one sensor input. The one or more operations of the processor may further comprise operations for transitioning the at least one state of the electronic locking device according to the state machine model in response to commanding the at least one electronic actuator to actuate the at least one locking mechanism from the locked position to the unlocked position.

Further aspects of the present disclosure provide for an electronic access control system comprising an electronic locking device configured to selectively secure a door or an access point of an enclosure. The electronic locking device may comprise at least one locking mechanism and at least one electronic actuator configured to actuate the at least one locking mechanism between a locked position and an unlocked position; a controller communicably engaged with the at least one electronic actuator to command the at least one electronic actuator to perform at least one action; an alarm system controller operably engaged with a local alarm for the door or the access point of the enclosure; and at least one sensor communicably engaged with one or both of the controller and the alarm system controller. The controller may comprise a wireless communication module configured to establish a wireless data transfer interface with at least one mobile electronic device. The alarm system controller may be communicably engaged with the controller via at least one data transfer interface. The at least one sensor may be configured to detect a position or a movement of the door or the access point of the enclosure. The controller may be configured to receive access code data from the at least one mobile electronic device via the wireless data transfer interface and process the access code data according to one or more electronic access control settings to verify at least one electronic access code for the electronic locking device. The controller may be configured to communicate a first signal to the alarm system controller in response to successfully verifying the at least one electronic access code. The alarm system controller may be configured to suppress the local alarm for the door or the access point of the enclosure in response to the first signal. The controller may be configured to command the at least one electronic actuator to actuate the at least one locking mechanism from the locked position to the unlocked position in response to communicating the first signal to the alarm system controller and successfully verifying the at least one electronic access code.

In accordance with certain embodiments, the at least one sensor is configured to communicate a sensor input to one or both of the controller and the alarm system in response to detecting a change in the position of the door or the access point of the enclosure. The alarm system controller may be configured to determine a state of the electronic locking device according to a state machine model in response to receiving the sensor input from the at least one sensor. The alarm system controller may be configured to engage the local alarm for the door or the access point of the enclosure in response to determining the electronic locking device is in a locked state. In certain embodiments, the controller is configured to transition at least one state of the electronic locking device according to a state machine model in response to receiving the sensor input from the at least one sensor. The controller may be configured to transition at least one state of the electronic locking device according to a state machine model in response to commanding the at least one electronic actuator to actuate the at least one locking mechanism from the locked position to the unlocked position. In accordance with certain embodiments, the electronic access control system may further comprise at least one remote server communicably engaged with one or both of the controller and the alarm system controller. The controller may be configured to communicate access event data for the electronic locking device to the at least one remote server in real-time.

Still further aspects of the present disclosure provide for an electronic access control apparatus comprising a lock body configured to be selectively coupled to a surface of a door; a locking mechanism coupled to the lock body, wherein the locking mechanism is configured to be selectively engaged between a locked position and an unlocked position; an electronic actuator coupled to the lock body and operably engaged with the locking mechanism to actuate the locking mechanism between the locked position and the unlocked position; and a controller communicably engaged with the electronic actuator to command the electronic actuator to actuate the locking mechanism between the locked position and the unlocked position. In certain embodiments, the controller comprises a wireless communication module configured to establish a wireless data transfer interface with at least one mobile electronic device. In certain embodiments, the controller comprises at least one processor and a non-transitory computer readable memory device comprising instructions stored thereon that, when executed, command the at least one processor to perform one or more operations. The one or more operations may comprise operations for establishing the wireless data transfer interface with the at least one mobile electronic device; receiving electronic access code data from the at least one mobile electronic device via the wireless data transfer interface; processing the electronic access code data according to one or more electronic access control settings to verify at least one electronic access code; communicating, in response to successfully verifying the at least one electronic access code, an alarm suppression signal to at least one alarm system controller or remote server; and commanding, in response to communicating the alarm suppression signal, the electronic actuator to actuate the locking mechanism from the locked position to the unlocked position.

In certain embodiments, the electronic access control apparatus may further comprise at least one sensor communicably engaged with the controller. The at least one sensor may be configured to detect a position or a movement of the door. In certain embodiments, the one or more operations of the processor may further comprise operations for determining at least one state of the locking mechanism according to a state machine model in response to receiving the electronic access code data from the at least one mobile electronic device. The electronic access control apparatus may further comprise a first knob or a turn piece coupled to the lock body and operably engaged with the locking mechanism to selectively engage the locking mechanism between the locked position and the unlocked position independently of the electronic actuator. The electronic access control apparatus may further comprise a keyed assembly coupled to the lock body and operably engaged with the locking mechanism to selectively engage the locking mechanism between the locked position and the unlocked position independently of the electronic actuator.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, with emphasis instead being placed upon illustrating the principles of the teachings. The drawings are not intended to limit the scope of the present teachings in any way. The system and method may be better understood from the following illustrative description with reference to the following drawings in which:

FIG. 3A is a functional block diagram of an electronic access control and alarm system, in accordance with certain aspects of the present disclosure;

DETAILED DESCRIPTION

Figure 1:
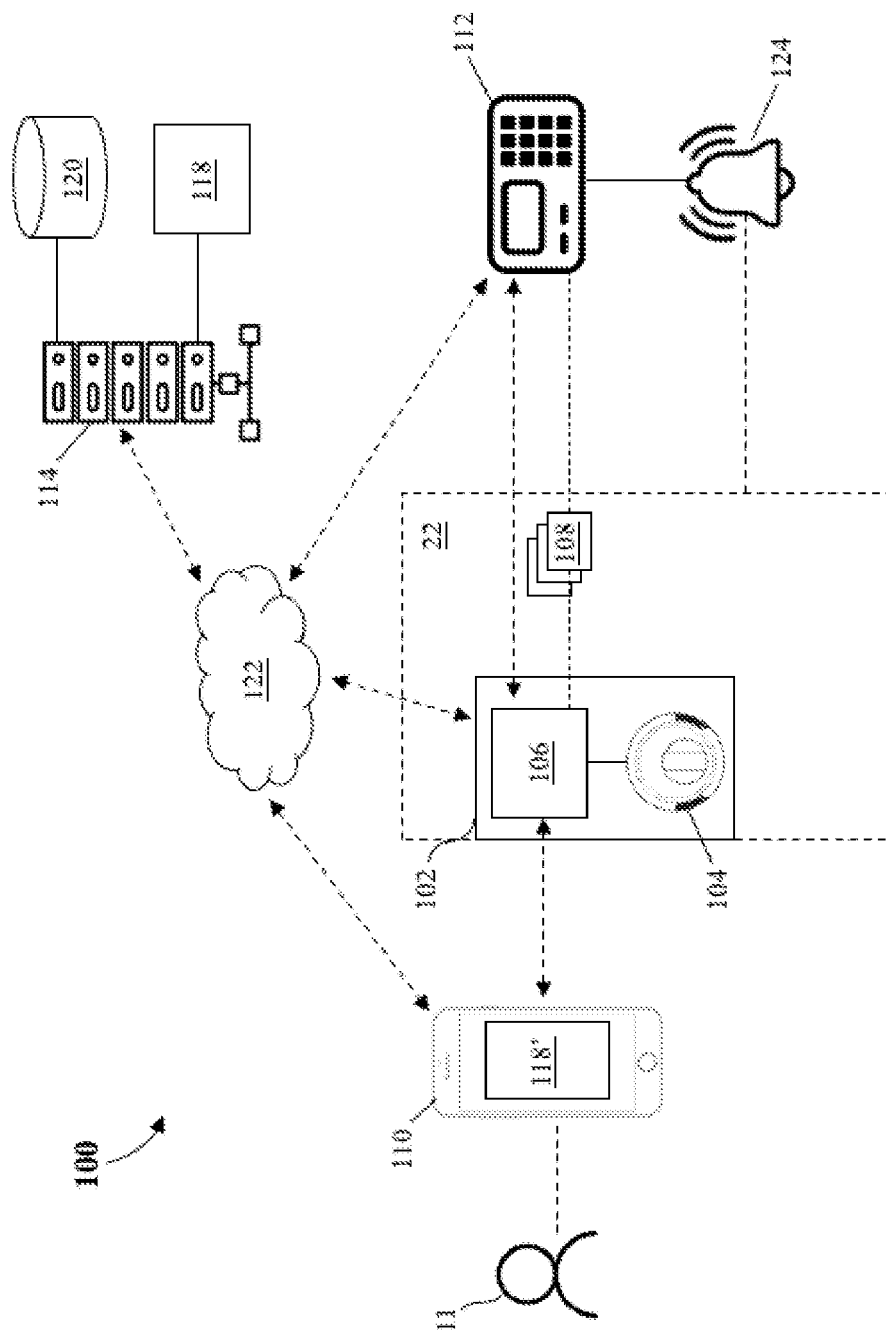
FIG. 1 is an architecture diagram of an electronic access control and alarm system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one BLUETOOTH advertisement channel.

As used herein, the term "state" refers to a description of the status of a system that is waiting to execute a transition including at least one action or a set of actions to be executed when a condition is fulfilled or when an event is received.

As used herein, the term "state machine" refers to a behavior model within an electronic access control system that is configured to process a given input according to a current state and perform a state transition and produce an output. In accordance with various aspects of the present disclosure, a state machine may comprise a finite number of states and may also be referred to as a finite-state machine (FSM). In accordance with various aspects of the present disclosure, a state machine may be defined wholly in a virtual environment and may also be referred to as a virtual finite-state machine (VFSM). A VFSM may provide a software specification method to describe the behavior of an electronic access control system using assigned names of input control properties and output actions. A VFSM method may comprise an execution model of an electronic access control system configured to facilitate one or more executable specification.

Certain objects and advantages of the present disclosure include an electronic access control device and system that is communicably engaged with a local or remote alarm system via a network interface to receive and process an electronic access request from a client device and grant access only to authorized users (e.g., those users with a valid access code/user account) and automatically suppress a door intrusion alarm upon authorized entry to a secured location. An object and advantage of the present disclosure includes elimination of security system false alarms triggered by authorized entrants who forget/fail to timely suppress or disable a security alarm for a secured location.

Certain objects and advantages of the present disclosure include a security and alarm system that is configured to differentiate between an authorized entry and an unauthorized entry at a door and automatically suppress or engage a local alarm for the door based on the authorized or unauthorized entry.

Certain exemplary embodiments of the present disclosure include an electronic access control and alarm system comprising an electronic access control device configured to selectively secure (i.e., lock and unlock) a door or other access point for an enclosure (e.g., gate or panel) and automatically engage or suppress a local alarm for the door or access point according to one or more system protocols/settings. The electronic access control device may comprise a controller comprising a wireless communications module, at least one processor and a non-transitory computer readable memory device communicably engaged with the at least one processor. The controller may be operably engaged with at least one battery/power source and an electronic actuator configured to engage/disengage a locking mechanism of the electronic access control device to selectively secure the door or access point. In certain embodiments, the locking mechanism may comprise a deadbolt. In certain embodiments, the electronic access control device may comprise a mechanical latch/actuator configured to engage/disengage the locking mechanism. The mechanical latch/actuator may be configured as a keyed lock cylinder or a knob or turn piece.

In accordance with certain aspects of the present disclosure, the electronic access control device may be communicably engaged with a mobile electronic device via a wireless communications interface. In certain embodiments, the wireless communications interface comprises a radio frequency (RF) transceiver configured to establish two-way communications via at least one wireless communication standard (e.g., BLUETOOTH). The mobile electronic device may comprise a client device associated with an authorized user of the electronic access control and alarm system. The mobile electronic device may be configured to communicate an electronic access request comprising a wireless signal containing at least one data packet comprising access code data and/or user identification/authentication data to the electronic access control device to request access to the door. The electronic access control device may be communicably engaged with a local or remote alarm system controller via at least one data transfer interface to suppress or engage a local alarm for the door according to one or more alarm system protocols. The electronic access control device and alarm system may be operably engaged to perform one or more operations configured to (1) receive and process the electronic access request from the mobile electronic device to authorize and/or authenticate an authorized user of the electronic access control device, (2) suppress or engage a door intrusion alarm associated with the alarm system, and (3) process a command signal to command the electronic actuator to disengage a locking mechanism of the electronic access control device in response to receiving/processing a valid access request.

In accordance with certain aspects of the present disclosure, one or more of the electronic access control device, alarm system controller and/or the mobile electronic device may be communicably engaged with one or more remote server via a network interface. The remote server may comprise one or more remote application server, back-end data system, remote alarm system and/or electronic access control system configured to command one or more operations for processing an access request from the mobile electronic device; configuring one or more integration parameters between the electronic access control device and the alarm system; and authorizing an access request for an authorized user of the integrated electronic access control and alarm system.

In accordance with certain embodiments, the electronic access control and alarm system may execute and/or comprise one or more process steps or operations for receiving a wireless signal from a mobile client device; processing one or more data packets contained therein to authenticate/authorize an access request from the electronic access control device; sending/receiving one or more communications to/from a local or remote alarm system to command one or more operations to suppress/disable a door intrusion alarm for a secured location; and commanding one or more operations of the electronic access control device to unlock a door/access point in response to authenticating the access request from an authorized user and suppressing/disabling the door intrusion alarm for the secured location.

Certain aspects of the present disclosure provide for an electronic access control system and method configured to link at least one electronic locking device and an access sensor for a door or access point. The electronic access control system and method may be configured to determine a current state of the electronic locking device (e.g., LOCKED or UNLOCKED) in response to an input from the access sensor indicative of an access event at the door or access point (e.g., opening the door). In accordance with certain aspects of the present disclosure, if the current state of the electronic locking device is locked when the access sensor indicates the door is open, then the system engages a local alarm for the door. Certain embodiments may provide for fail safe protocols to prevent false alarms. For example, the system may check a network status of the electronic locking device before engaging the alarm and/or may apply a delay before generating the alarm. The system may be configured to provide a communication to a server or monitoring station indicative of the nature of the alarm and the access data. If the door was not properly locked (i.e., door locked but not latched), the system may be configured to provide one or more alerts or notifications (e.g., possible false alarm message) to the server or monitoring station to indicate the door was not secured properly instead of engaging a full alarm. In certain embodiments, the electronic access control system and method may comprise two or more door sensors that can be queried by a controller to determine the state of the door and whether the sensors have been compromised.

Turning now descriptively to the drawings, in which similar reference characters denote similar elements throughout the several views, FIG. 1 depicts an architecture diagram of an integrated electronic access control and alarm system 100. In accordance with certain aspects of the present disclosure, system 100 comprises an integrated electronic access control and alarm system configured to enable one or more steps or operations to receive and authorize an access request at an EAC device, suppress a door intrusion alarm for at least one door, and unlock at least one door associated with the EAC device/access request. System 100 may comprise an EAC device 102, a client device 110, an alarm system controller 112, and an EAC server 114. Client device 110 may comprise a smart phone, tablet computer, mobile electronic device, mobile computing device, personal computing device, and the like. EAC server 114 may comprise a remote (i.e., cloud) server within a wide area (i.e., distributed) network and/or a local server (i.e., on site) within a local area network. Alarm system controller 112 may be communicably engaged with a local alarm 124 to command/control one or more functions of local alarm 124. Local alarm 124 may be configured to engage one or more alarm (i.e., visual alarm, audible alarm, etc.) in response to an unauthorized access event at door 22. In accordance with certain aspects of the present disclosure, EAC device 102 comprises a controller 106 and an electronic locking assembly 104. Controller 106 may comprise an electronics assembly configured to command one or more operations of electronic locking assembly 104, including actuating at least one locking mechanism of electronic locking assembly 104 between a locked position and an unlocked position. Electronic locking assembly 104 may comprise an electronic deadbolt lock configured to slidably engage a deadbolt between an extended (i.e., locked) position and a retracted (i.e., unlocked) position. In accordance with certain aspects of the present disclosure, EAC device 102 is operably installed on a door 22 and is configured to selectively secure (i.e., lock) door 22 to a door frame (or other structure) to restrict access to door 22 when EAC device 102 is engaged in the locked position. System 100 may further comprise one or more sensors 108 operably installed at door 22. Sensors 108 may comprise one or more sensors configured to sense movement or a position of door 22 in response to door 22 being opened or closed. Sensors 108 may include one or more position and/or motion sensors including, but not limited to, one or more accelerometer, contact sensors including surface mount sensors, overhead sensors and rollerball sensors, capacitive displacement sensor, inductive sensor, one or more position encoder, proximity sensor (optical), digital camera, digital transducer, and the like. Sensors 108 may be communicably engaged with one or both of controller 106 and/or alarm system controller 112 via one or more system bus or wireless data transfer interface.

In accordance with certain aspects of the present disclosure, controller 106 may be communicably engaged with client device 110 via a wireless data transfer interface. In certain embodiments, the wireless data transfer interface comprises a BLUETOOTH connection. Controller 106 may be further communicably engaged with alarm system controller 112 via a wireline or wireless data transfer interface (e.g., BLUETOOTH or WiFi). One or more of client device 110, controller 106 and alarm system controller 112 may be communicably engaged with EAC server 114 via network interface 112. Network interface 112 may comprise a wireless network interface (e.g., WiFi, 4G, 5G, etc.) and/or a wireline (e.g., Ethernet) network interface. EAC server 114 may be communicably engaged with at least one EAC database 120 configured to store, maintain and access data for system 100. EAC database 120 may be configured to provide one or more concurrency, security, backup and recovery, integrity and data description functions for EAC server 114. EAC server 114 may further comprise an EAC application 118 hosted thereon. EAC application 118 may comprise a plurality of processor-executable instructions for commanding and managing one or more EAC functions within system 100. The one or more EAC functions may include, but are not limited to, functions for creating, assigning and verifying various login credentials (e.g., usernames and passwords, PINs, biometric scans, and security tokens); managing user rights and permissions, including discretionary access control, mandatory access control, role-based access control, and/or attribute-based access control; EAC device management; and other customary EAC functions. EAC application 118 may further comprise processor-executable instructions for providing an end user instance 118' of EAC application 118 at client device 110. End user instance 118' may comprise a graphical user interface configured to enable an end user to select one or more EAC devices (e.g., EAC device 102) within system 100, establish a wireless data transfer interface therewith, and provide an electronic access request thereto. In certain embodiments, EAC application 118 may further comprise software configured to command and execute a plurality of operations of a virtual finite state machine within system 100. In accordance with certain aspects of the present disclosure, EAC application 118 may further comprise software to configure a state machine model comprising one or more inputs, states, transition conditions, and outputs for EAC device 102, sensors 108 and/or alarm system controller 112. In certain embodiments, controller 106 may comprise software and/or hardware for executing at least one state machine/state machine model for EAC device 102. In certain embodiments, alarm system controller 112 may comprise software and/or hardware for executing at least one state machine/state machine model for local alarm 124.

In accordance with certain aspects of the present disclosure, an end user 11 may instantiate end user instance 118' at client device 110. End user 11 may provide one or more user-generated inputs at the graphical user interface of end user instance 118' to establish a wireless data transfer interface (e.g., BLUETOOTH connection) with controller 106 of EAC device 102 and communicate an access request for door 22 thereto. The access request may comprise a wireless signal comprising at least one data packet comprising one or more of an electronic access code, user authentication data and/or device authentication (e.g., token) data. Controller 106 may receive the access request and process the data according to one or more control settings. In certain embodiments, controller 106 may communicate at least a portion of the data to EAC server 114 via network interface 122. EAC server 114 may process the data via one or more operations of EAC application 118 to authenticate user 11 and/or client device 110. If controller 106 fails to verify/authenticate the access request data (e.g., the electronic access code is incorrect or the user lacks permission to enter door 22), controller 106 may deny the access request and communicate a denial message to client device 110 via the wireless data transfer interface. The denial message may include one or more reasons for denying the access request. The denial message may be presented to end user 11 at the graphical user interface. If controller 106 successfully verifies/authenticates the access request data, controller 106 may send at least one signal to alarm system controller 112 via the data transfer interface therebetween. The at least one signal may comprise at least one data packet comprising data related to authorizing the access request and/or providing one or more credentials/code for disengaging local alarm 124. Alarm system controller 112 may process the data according to one or more alarm system protocols to disengage/suppress local alarm 124. In certain embodiments, alarm system controller 112 may provide at least one signal to controller 106 to confirm that local alarm 124 has been disengaged/suppressed. Controller 106 may proceed to execute one or more operations for commanding electronic locking assembly 104 to actuate from a locked position to an unlocked position to grant access to door 22. Controller 106 may proceed to execute one or more operations for communicating a confirmation to client device 110 to indicate the access request has been granted at EAC device 102.

Figure 2A:
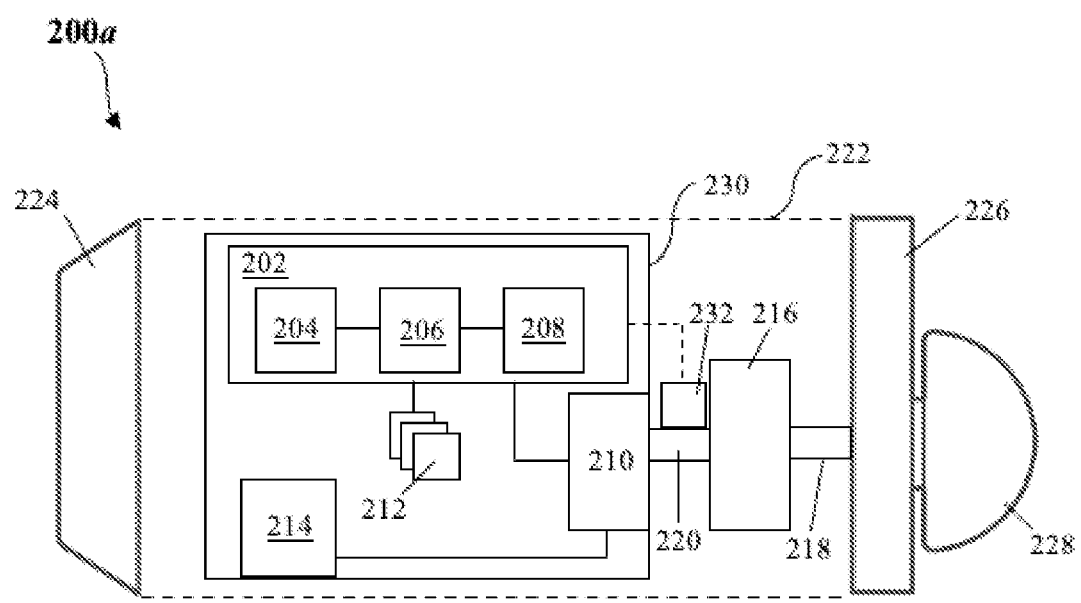
FIG. 2A is a component diagram of an embodiment of an electronic access control device and system, in accordance with certain aspects of the present disclosure.

Referring now to FIG. 2A, a component diagram illustrating an embodiment of an electronic access control (EAC) device 200a is shown. In accordance with certain aspects of the present disclosure, EAC device 200a comprises an embodiment of EAC device 102 in FIG. 1 and is incorporated within system 100 of FIG. 1. EAC device 200a may be configured to be installed at a door (e.g., door 22 of FIG. 1) or other access point (e.g., gate, cabinet panel, etc.) to selectively secure (i.e., lock) said door or other access point. In accordance with certain aspects of the present disclosure, EAC device 200a may comprise a housing 222 that may be selectively secured to the door or access panel and may extend through a portion of the door or access panel between an outside surface of the door or access panel and an inside surface of the door or access panel. EAC device 200a may comprise an outside housing plate 224 and an inside housing plate 226 defining an exterior surface of the housing. Outside housing plate 224 is configured to mount on an exterior surface of the door or access panel and inside housing plate 226 is configured to mount on an interior surface of the door or access panel, when the door is closed. Outside housing plate 224 may comprise a blank plate (i.e., without a key cylinder or keypad) to provide added security for EAC device 200a. Inside housing plate 226 may further comprise a turn piece 228 disposed thereon. Turn piece 228 may be operably engaged with a tailpiece 218 to rotate tailpiece 218 around an axis of rotation. Tailpiece 218 may comprise a shaft or a spindle (or other mechanism) configured to engage a deadbolt 216 between an extended (i.e., locked) position and a retracted (i.e., unlocked) position (e.g., in response to a user rotating turn piece 228)

In accordance with certain embodiments, EAC device 200a may comprise an electronics assembly 230 housed within an interior area of housing 222. Electronics assembly 230 may comprise a controller 202, one or more sensors 212, an electronic actuator 210 and a battery 214. Controller 202 may comprise a processor 204, a non-transitory computer readable memory device 206 and a communications module 208. Communications module 208 may comprise an RF transceiver configured to establish a wireless data transfer interface with at least one client device (e.g., client device 110 in FIG. 1). Memory device 206 may comprise firmware/software stored thereon comprising processor-executable instructions that, when executed by processor 204, command processor 204 to perform a plurality of operations. Electronic actuator 210 may comprise an electric motor configured to turn a shaft 220 to engage deadbolt 216 between the extended (i.e., locked) position and the retracted (i.e., unlocked) position. In certain embodiments, electronic actuator 210 may comprise a solenoid configured to extend and retract shaft 220 to engage deadbolt 216 between the extended (i.e., locked) position and the retracted (i.e., unlocked) position. Sensors 212 may comprise one or more sensors configured to sense a position or movement of EAC device 200a when operably installed in a door. EAC device 200a may further comprise at least one sensor 232 configured to sense a position or movement of deadbolt 216 in response to deadbolt 216 being configured between the extended (i.e., locked) position and the retracted (i.e., unlocked) position. Sensors 212 and at least one sensor 232 may comprise one or more accelerometer, capacitive displacement sensor, e-compass, Eddy-current sensor, Hall effect sensor, inductive sensor, Laser Doppler vibrometer, linear variable differential transformer, piezo-electric transducer, one or more position encoder, potentiometer, proximity sensor (optical), string potentiometer, ultrasonic sensor, and/or other sensors or switches configured to sense position or movement of one or more components.

Figure 2B:
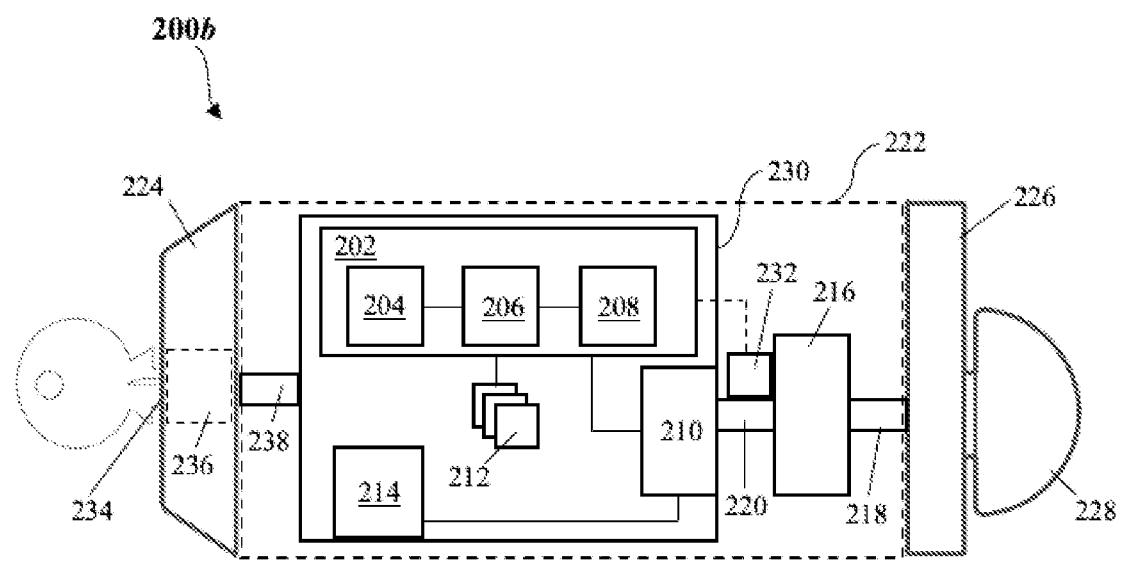
FIG. 2B is a component diagram of an embodiment of an electronic access control device and system, in accordance with certain aspects of the present disclosure.

Referring now to FIG. 2B, a component diagram illustrating an embodiment of an electronic access control (EAC) device 200b is shown. In accordance with certain aspects of the present disclosure, EAC device 200b comprises an alternative embodiment of EAC device 200a in FIG. 2A. In accordance with certain aspects of the present disclosure, EAC device 200b may comprise the same elements as EAC device 200a with the addition of a keyed override assembly comprising a key cylinder 236, an override shaft 238 and a key receiving portion 234. Key cylinder 236 may be coupled to a portion of outside housing plate 224 and may extend from an exterior surface of outside housing plate 224 to an interior area of housing 222. Key cylinder 236 may comprise a key receiving portion 234 configured to receive a key and rotate key cylinder 236 to turn override shaft 238. Override shaft 238 may be operably engaged with deadbolt 216 to engage deadbolt 216 between the extended (i.e., locked) position and the retracted (i.e., unlocked) position. In certain embodiments, override shaft 238 may be operably engaged with tailpiece 218 to engage deadbolt 216 between the extended (i.e., locked) position and the retracted (i.e., unlocked) position. In certain embodiments, override shaft 238 may be operably engaged with shaft 220 to engage deadbolt 216 between the extended (i.e., locked) position and the retracted (i.e., unlocked) position.

Figure 2C:
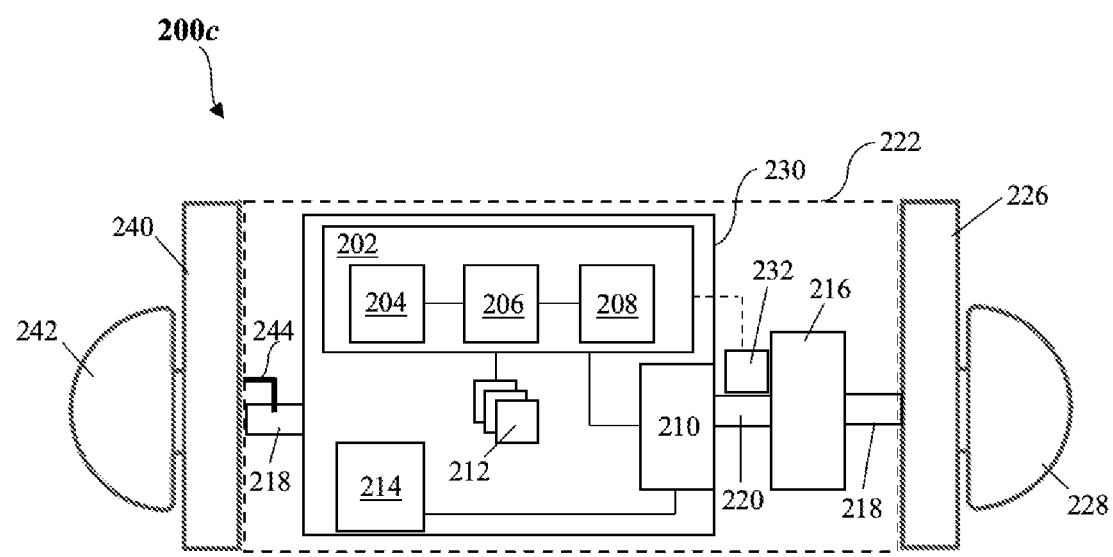
FIG. 2C is a component diagram of an embodiment of an electronic access control device and system, in accordance with certain aspects of the present disclosure.

Referring now to FIG. 2C, a component diagram illustrating an embodiment of an electronic access control (EAC) device 200c is shown. In accordance with certain aspects of the present disclosure, EAC device 200c comprises an alternative embodiment of EAC device 200a in FIG. 2A. In accordance with certain aspects of the present disclosure, EAC device 200c may comprise the same elements as EAC device 200a with the addition of a second turn piece 242 and a flange 244. In certain embodiments, second turn piece 242 is operably engaged with flange 244 to rotate flange 244 around an axis. Flange 244 may be interfaced with tail piece 218 to rotate tail piece 218 around an axis to engage deadbolt 216 between the extended (i.e., locked) position and the retracted (i.e., unlocked) position. In accordance with an embodiment, electronic actuator 210 may comprise a solenoid configured to selectively establish an interface between shaft 220 and deadbolt 216 such that shaft 220 is configured to block/restrict deadbolt 216 from being retracted from the locked position when interfaced with deadbolt 216. In said embodiment, flange 244 is configured to break if the user applies excessive force to turn piece 242 when shaft 220 is interfaced with deadbolt 216.

Referring now to FIG. 3A, a functional block diagram 300a of an integrated electronic access control and alarm system is shown. The integrated electronic access control and alarm system may comprise system 100 of FIG. 1. In accordance with certain aspects of the present disclosure, functional block diagram 300a illustrates a process flow of one or more steps or operations between client device 110, EAC device 102 and alarm controller 112 within system 100 of FIG. 1. In accordance with certain aspects of the present disclosure, client device 110 may be configured to execute one or more operations to establish a data transfer interface with EAC device 102 (Block 302a). Client device 110 may be further configured to execute one or more operations to configure an access request for a door or other access point and send the access request to EAC device 102 via the wireless data transfer interface (Block 304a). The access request may comprise at least one electronic access control code for EAC device 102 and/or user/device authentication data. In accordance with certain embodiments, EAC device 102 may be configured to execute one or more operations to receive the at least one electronic access control code and/or user/device authentication data (Block 306a) and process the at least one electronic access control code and/or user/device authentication data according to one or more settings/parameters stored in memory (Block 308a). The one or more settings/parameters stored in memory may comprise operations for verifying/authenticating the electronic access control code and/or user/device authentication data to grant or deny the access request (Block 310a). In response to verifying/authenticating the electronic access control code and/or user/device authentication data, EAC device 102 may be configured to execute one or more operations to communicate at least one alarm control signal to alarm controller 112 via at least one data transfer interface (Block 312a). Alarm controller 112 may be configured to receive and process the at least one alarm control signal according to one or more alarm system parameters (Block 314a) and suppress or disengage a local alarm for the door or other access point (Block 316a). Alarm controller 112 may be configured to send a message/signal to EAC device 102 to confirm the local alarm for the door or other access point has been suppressed or disengaged (Block 318a). EAC device 102 may be configured to execute one or more operations to receive and process the signal from alarm controller (Block 320a) and engage an electronic actuator to actuate at least one locking mechanism from a locked position to an unlocked position to unlock the door or other access point (Block 322a). Client device 110 may be configured to receive an access confirmation signal from EAC device 102 and render an access confirmation message at a display of client device 110 (Block 324a).

Figure 3B:
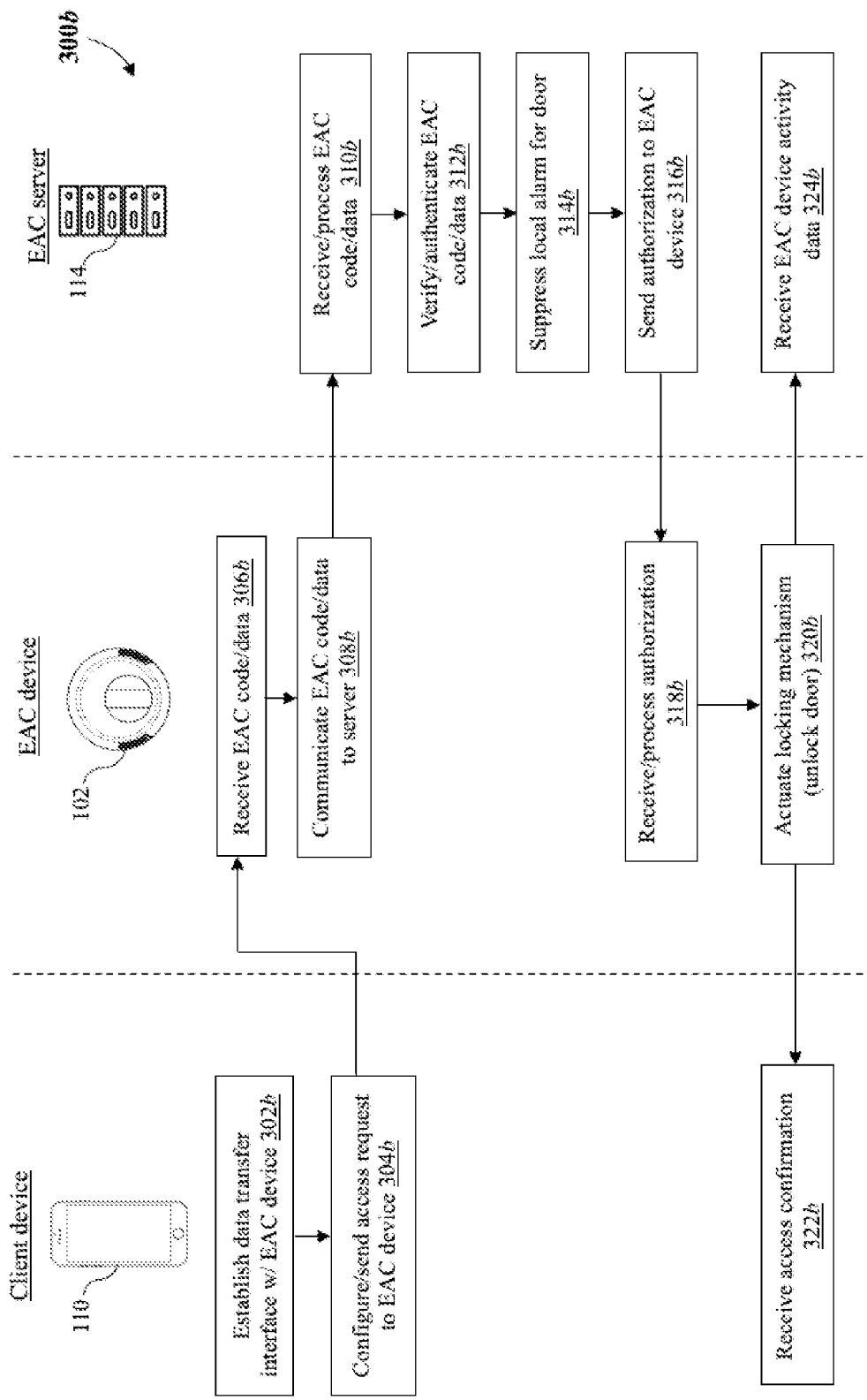
FIG. 3B is a functional block diagram of an electronic access control and alarm system, in accordance with certain aspects of the present disclosure.

Referring now to FIG. 3B, a functional block diagram 300b of an integrated electronic access control and alarm system is shown. The integrated electronic access control and alarm system may comprise system 100 of FIG. 1. In accordance with certain aspects of the present disclosure, functional block diagram 300b illustrates a process flow of one or more steps or operations between client device 110, EAC device 102 and EAC server 114 within system 100 of FIG. 1. The process flow illustrated in functional block diagram 300b may be an alternative or additional process flow to functional block diagram 300a. In accordance with certain aspects of the present disclosure, client device 110 may be configured to execute one or more operations to establish a data transfer interface with EAC device 102 (Block 302b). Client device 110 may be further configured to execute one or more operations to configure an access request for a door or other access point and send the access request to EAC device 102 via the wireless data transfer interface (Block 304b). The access request may comprise at least one electronic access control code for EAC device 102 and/or user/device authentication data. In accordance with certain embodiments, EAC device 102 may be configured to execute one or more operations to receive the at least one electronic access control code and/or user/device authentication data (Block 306b). EAC device 102 may be configured to execute one or more operations to communicate (e.g., via a network interface) the at least one electronic access control code and/or user/device authentication data to EAC server 114 (Block 308b). EAC server 114 may be configured to execute one or more operations to receive and process the least one electronic access control code and/or user/device authentication data according to a plurality of EAC control parameters/settings (Block 310b). The EAC control parameters/settings may comprise one or more operations of EAC application 118 in FIG. 1. The EAC control parameters/settings may comprise at least one state machine model. The EAC control parameters/settings may comprise one or more alarm system control parameters. EAC server 114 may execute one or more operations to verify/authenticate the electronic access control code and/or user/device authentication data to grant or deny the access request (Block 312b). In accordance with certain aspects of the present disclosure, EAC server 114 may execute one or more operations to suppress a local alarm for the door or access point (Block 314b). This may comprise sending at least one communication to an alarm system controller and/or an alarm system server. In response to granting the access request and/or suppressing the local alarm for the door or access point, EAC server 114 may communicate an authorization signal to EAC device 102 (e.g., via the network interface) (Block 316b). EAC device 102 may execute one or more operations to receive and process the authorization signal (Block 318b) and engage an electronic actuator to actuate at least one locking mechanism from a locked position to an unlocked position to unlock the door or other access point (Block 320b). Client device 110 may be configured to receive an access confirmation signal from EAC device 102 and render an access confirmation message at a display of client device 110 (Block 322b). EAC server 114 may be configured to receive activity data from EAC device 102 in real-time or at one or more designated intervals and store the activity data in an EAC database (e.g., EAC database 120) (Block 324b).

Figure 4:
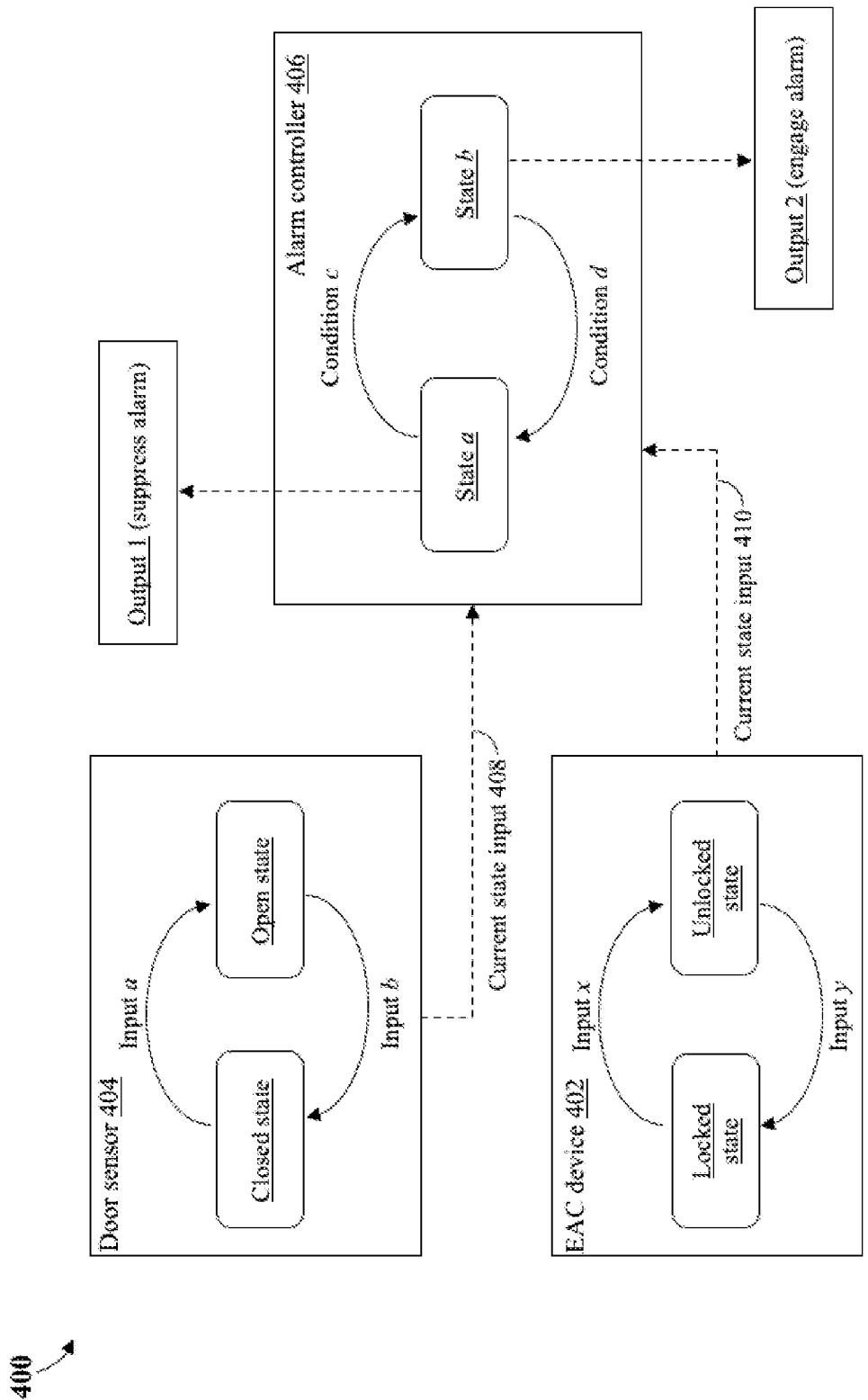
FIG. 4 is a state diagram of an electronic access control and alarm system, in accordance with certain aspects of the present disclosure.

Referring now to FIG. 4, a state diagram 400 of an electronic access control and alarm system is shown. The electronic access control and alarm system may comprise system 100 of FIG. 1. State diagram 400 illustrates a state machine model comprising states, inputs, state transitions, and outputs for an EAC device 402, a door sensor 404, and an alarm controller 406 within one or more finite state machine and/or virtual finite state machine. In accordance with certain aspects of the present disclosure, EAC device 402 comprises EAC device 102 in FIG. 1, door sensor 404 comprises at least one sensor in sensors 108 in FIG. 1, and alarm controller 406 comprises alarm system controller 112 in FIG. 1. In accordance with certain aspects of the present disclosure, state diagram 400 illustrates a state machine model that describes the operations by which alarm controller 406 may engage a local alarm or disengage a local alarm for at least one door or access point.

In accordance with certain aspects of the present disclosure, EAC device 402 may be transitioned between a Locked state and an Unlocked state according to a state machine model. As shown in state diagram 400, the state machine model is configured to effect a state transition for EAC device 402 from the Locked state to the Unlocked state in response to Input x. In accordance with certain embodiments, Input x comprises a valid access request received from a client device (e.g., client device 110 in FIG. 1). The state machine model is configured to effect a state transition for EAC device 402 from the Unlocked state to the Locked state in response to Input y. In accordance with certain embodiments, Input y may comprise an automatic and/or user-generated input configured to command EAC device 402 to perform at least one locking function. In accordance with certain aspects of the present disclosure, EAC device 402 is configured to provide one or more inputs 410 to alarm controller 406 corresponding to a current state (e.g., Locked or Unlocked) for EAC device 402.

In accordance with certain aspects of the present disclosure, door sensor 404 may be transitioned between a Closed state and an Open state according to the state machine model. As shown in state diagram 400, the state machine model is configured to effect a state transition for door sensor 404 from the Closed state to the Open state in response to Input a. In accordance with certain embodiments, Input a comprises a first sensor input corresponding to door sensor 404 detecting a movement or change in position of the door. The state machine model is configured to effect a state transition for door sensor 404 from the Open state to the Closed state in response to Input b. In accordance with certain embodiments, Input b may comprise a second sensor input corresponding to door sensor 404 detecting a movement or change in position of the door. In accordance with certain aspects of the present disclosure, door sensor 404 is configured to provide one or more inputs 408 to alarm controller 406 corresponding to a current state (e.g., Open or Closed) for the door.

In accordance with certain aspects of the present disclosure, alarm controller 406 may engage a local alarm or disengage a local alarm for at least one door or access point according to the state machine model. In accordance with certain embodiments, alarm controller 406 may be transitioned between a State a and a State b. State a may effect an Output 1 (suppress alarm) and State b may effect an Output 2 (engage alarm). Condition c may correspond to current state input 408 from door sensor 404 and Condition d may correspond to current state input 410 from EAC device 402. In accordance with certain embodiments, Condition c may comprise a current state input 408 corresponding to the Open state for door sensor 404; i.e., indicating the door is open. The state machine model may query current state input 410 from EAC device 402 to determine a current state of EAC device 402. In accordance with certain embodiments, Condition d may comprise a current state input 408 corresponding to the Unlocked state for EAC device 402; i.e., indicating EAC device 402 is unlocked. According to the state machine model, if Condition c is present (i.e., the current state for door sensor 404 is Open) and Condition d is not present (i.e., the current state for EAC device 402 is locked), the state machine model may effect a state transition for alarm controller 406 from State a to State b and generate Output 2; i.e., engage a local alarm. According to the state machine model, if Condition c is present (i.e., the current state for door sensor 404 is Open) and Condition d is present (i.e., the current state for EAC device 402 is unlocked), the state machine model may maintain alarm controller 406 in State a (or effect a state transition for alarm controller 406 from State b to State a) and generate Output 1; i.e., suppress the local alarm.

Figure 5:
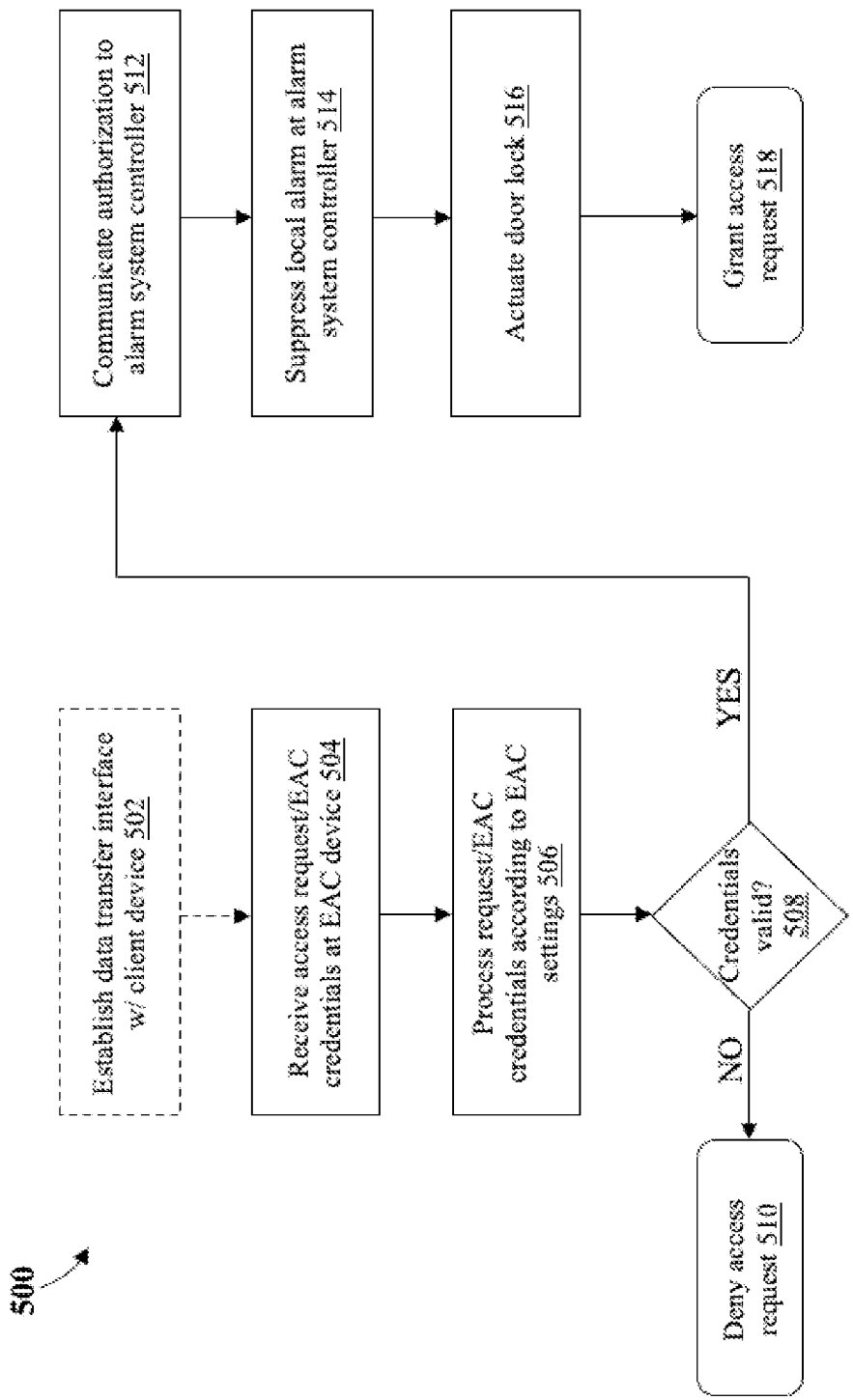
FIG. 5 is a process flow diagram of a routine of an electronic access control and alarm system, in accordance with certain aspects of the present disclosure.

Referring now to FIG. 5, a process flow diagram of a routine 500 of an electronic access control and alarm system is shown. Routine 500 may comprise one or more routines and/or operations of system 100 in FIG. 1. One or more steps or operations of routine 500 may be executed across one or more disparate elements of system 100 in FIG. 1 including, but not limited to, client device 110, EAC device 102, alarm system controller 112 and EAC server 114. In accordance with certain aspects of the present disclosure, routine 500 may, optionally, comprise one or more steps or operations for establishing a data transfer interface between an EAC device and a client device (Step 502). In certain embodiments, the data transfer interface may comprise a wireless data transfer interface, such as a BLUETOOTH connection. Routine 500 may proceed by executing one or more steps or operations for receiving an access request at the EAC device (Step 504). The access request may comprise one or more EAC credentials including, but not limited to, an electronic access control code, user authentication data and/or device authentication data. Routine 500 may proceed by executing one or more steps or operations for processing the access request/EAC credentials according to a plurality of EAC controls/settings (Step 506). Routine 500 may proceed by executing at least one decision step according to the plurality of EAC controls/settings to determine whether the access request/EAC credentials is/are valid (Step 508). If an output of step 508 is NO (i.e., the access request/EAC credentials is/are not valid), then routine 500 may proceed to execute one or more steps or operations to deny the access request (Step 510). If an output of step 508 is YES (i.e., the access request/EAC credentials is/are valid), then routine 500 may proceed to execute one or more steps or operations to communicate an authorization signal to an alarm system controller (Step 512). Routine 500 may proceed by executing one or more steps or operations for suppressing a local alarm at the alarm system controller in response to communicating the authorization signal to the alarm system controller (Step 514). In response to suppressing the local alarm at the alarm system controller, routine 500 may proceed by executing one or more steps or operations for actuating a door lock via the EAC device (Step 516) and granting the access request (Step 518).

Figure 6:
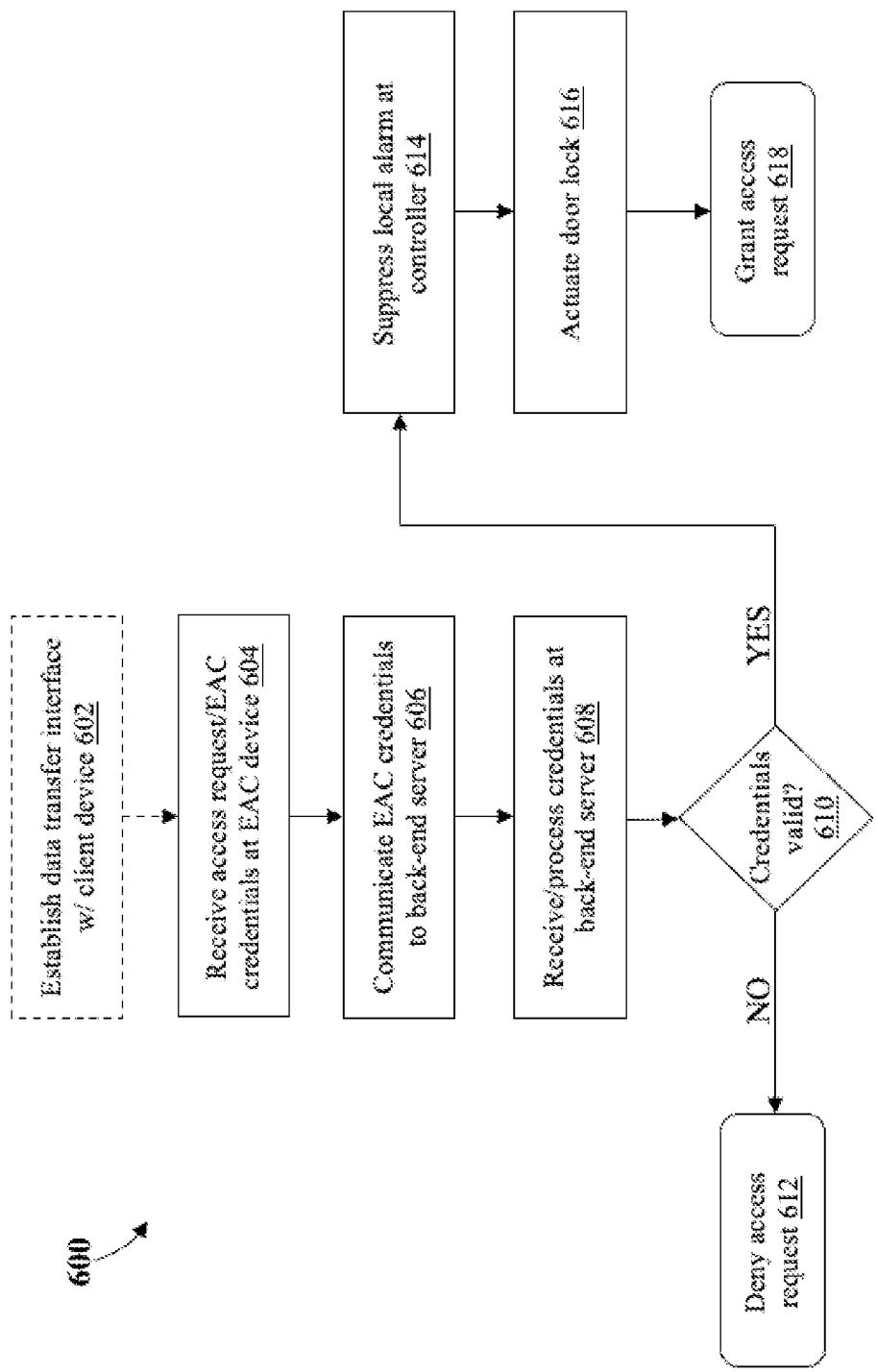
FIG. 6 is a process flow diagram of a routine of an electronic access control and alarm system, in accordance with certain aspects of the present disclosure.

Referring now to FIG. 6, a process flow diagram of a routine 600 of an electronic access control and alarm system is shown. In accordance with certain aspects of the present disclosure, routine 600 may comprise one or more system routines of system 100 in FIG. 1. One or more steps or operations of routine 600 may be executed across one or more disparate elements of system 100 in FIG. 1 including, but not limited to, client device 110, EAC device 102, alarm system controller 112 and EAC server 114. Routine 600 may be successive or sequential to one or more steps or operations of routine 500 in FIG. 5 and/or may comprise one or more sub-steps or sub-operations of routine 500 in FIG. 5.

In accordance with certain aspects of the present disclosure, routine 600 may, optionally, comprise one or more steps or operations for establishing a data transfer interface between an EAC device and a client device (Step 602). In certain embodiments, the data transfer interface may comprise a wireless data transfer interface, such as a BLUETOOTH connection. Routine 600 may proceed by executing one or more steps or operations for receiving an access request at the EAC device (Step 604). The access request may comprise one or more EAC credentials including, but not limited to, an electronic access control code, user authentication data and/or device authentication data. Routine 600 may proceed by executing one or more steps or operations for communicating the access request/EAC credentials to at least one back-end server (Step 606). Routine 600 may proceed by executing one or more steps or operations for receiving and processing the access request/EAC credentials according to a plurality of EAC controls/settings at the back-end server (Step 608). Routine 600 may proceed by executing at least one decision step according to the plurality of EAC controls/settings to determine whether the access request/EAC credentials is/are valid (Step 610). If an output of step 610 is NO (i.e., the access request/EAC credentials is/are not valid), then routine 600 may proceed to execute one or more steps or operations to deny the access request (Step 612). If an output of step 610 is YES (i.e., the access request/EAC credentials is/are valid), then routine 600 may proceed to execute one or more steps or operations for suppressing at least one local alarm associated with the access request (Step 614). In response to suppressing the local alarm, routine 600 may proceed by executing one or more steps or operations for actuating a door lock via the EAC device (Step 616) and granting the access request (Step 618).

Figure 7:
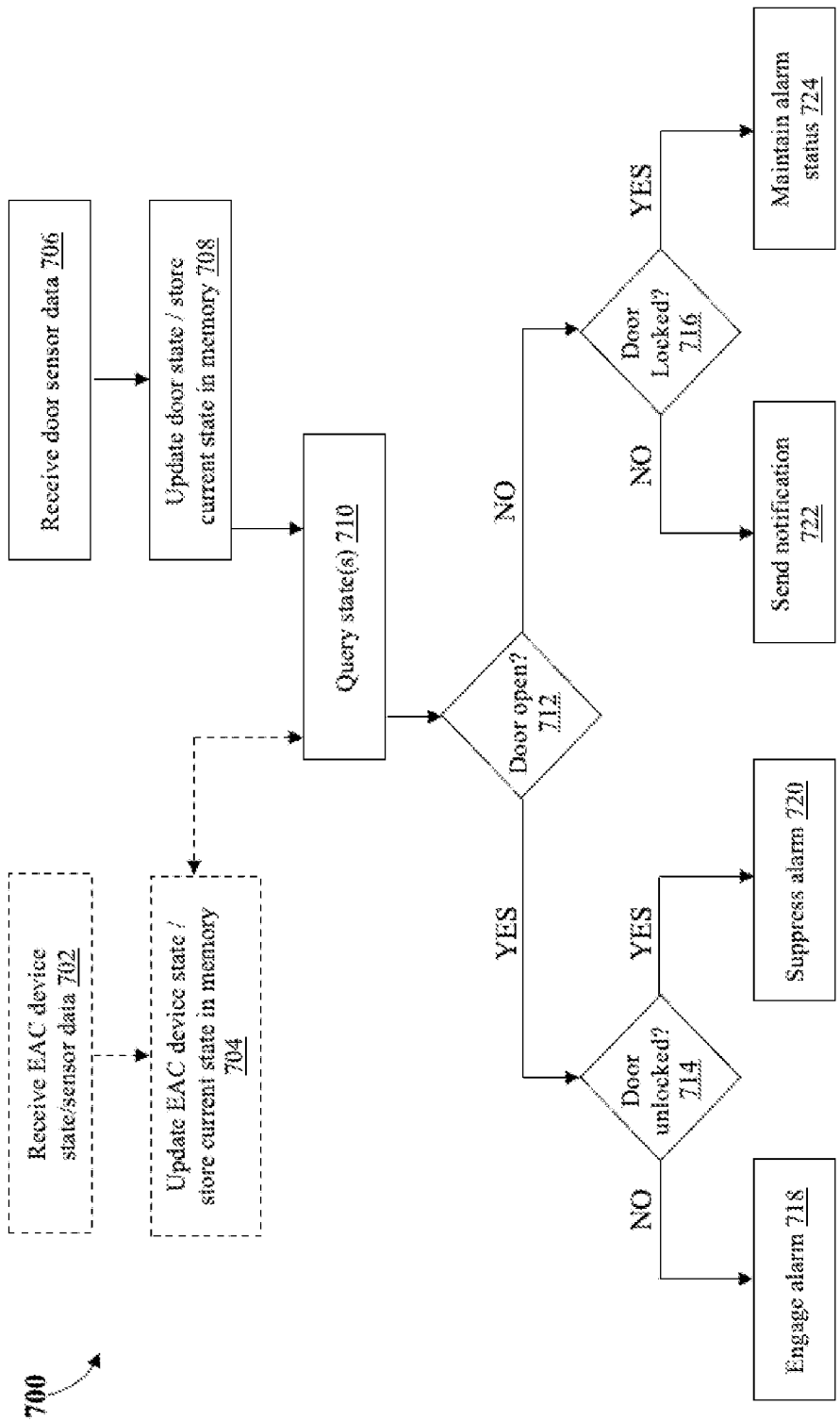
FIG. 7 is a process flow diagram of a routine of an electronic access control and alarm system, in accordance with certain aspects of the present disclosure.

Referring now to FIG. 7, a process flow diagram of a routine 700 of an electronic access control and alarm system is shown. In accordance with certain aspects of the present disclosure, routine 700 may comprise one or more system routines of system 100 in FIG. 1. One or more steps or operations of routine 700 may be executed across one or more disparate elements of system 100 in FIG. 1 including, but not limited to, client device 110, EAC device 102, alarm system controller 112 and EAC server 114. Routine 700 may be successive or sequential to one or more steps or operations of routines 500 and/or 600 in FIGS. 5 and 6 and/or may comprise one or more sub-steps or sub-operations of routines 500 and/or 600 in FIGS. 5 and 6. In accordance with certain embodiments, routine 700 may comprise a state machine model as shown in state diagram 400 in FIG. 4.

In accordance with certain aspects of the present disclosure, routine 700 may comprise one or more steps or operations for receiving state data and/or sensor data for at least one EAC device at an alarm system controller and/or back-end server (Step 702). The state data and/or sensor data may comprise data associated with a state/status of at least one locking mechanism of the least one EAC device (e.g., LOCKED/UNLOCKED). The state data and/or sensor data may be received in real-time or at one or more designated intervals and/or may be queried ad hoc by the alarm system controller and/or back-end server. Routine 700 may comprise one or more steps or operations for updating/transitioning a current state of the at least one EAC device according to a state machine model and storing the current state in memory of the alarm system controller and/or back-end server (Step 704). Routine 700 may comprise one or more steps or operations for receiving state data and/or sensor data for a door (or other access point) associated with the at least one EAC device at the alarm system controller and/or the back-end server (Step 706). The state data and/or sensor data may comprise data associated with a position/status of the door (e.g., OPEN/CLOSED). The state data and/or sensor data may be received in real-time or at one or more designated intervals and/or may be queried ad hoc by the alarm system controller and/or back-end server. Routine 700 may comprise one or more steps or operations for updating/transitioning a current state of the door according to the state machine model and storing the current state in memory of the alarm system controller and/or back-end server (Step 708). In accordance with certain aspects of the present disclosure, steps 706-708 may be executed concurrently or concomitantly with steps 702-704. In accordance with certain aspects of the present disclosure, routine 700 may proceed by executing one or more steps or operations for querying the current state of the at least one EAC device and/or the door (i.e., sensor data) (Step 710). In accordance with certain embodiments, routine 700 may execute step 710 in response to receiving/processing door sensor data indicative of the door being in an OPEN state.

In accordance with certain aspects of the present disclosure, routine 700 may proceed by executing one or more decision steps 712-716. In certain embodiments, decision steps 712-716 may comprise one or more steps or operations within the state machine model (i.e., virtual finite state machine). Routine 700 may proceed by executing one or more steps or operations for determining whether the door is open (i.e., in an OPEN state) according to the state data and/or the sensor data (Step 712). If the output of step 712 is NO (i.e., the state data and/or the sensor data indicates the door is in a CLOSED state), routine 700 may proceed by executing one or more steps or operations for determining whether the door is locked (i.e., the EAC device is in a LOCKED state) according to the state data and/or the sensor data (Step 716). If the output of step 716 is NO (i.e., the state data and/or the sensor data indicates the EAC device is in an UNLOCKED state), routine 700 may proceed by executing one or more steps or operations for sending at least one notification to at least one client device to alert at least one end user that the door is CLOSED and UNLOCKED (Step 722). If the output of step 716 is YES (i.e., the state data and/or the sensor data indicates the EAC device is in a LOCKED state), routine 700 may proceed by executing one or more steps or operations for maintaining an alarm status (e.g., armed/engaged) for the door (Step 724). If the output of step 712 is YES (i.e., the state data and/or the sensor data indicates the door is in an OPEN state), routine 700 may proceed by executing one or more steps or operations for determining whether the door is unlocked (i.e., the EAC device is in an UNLOCKED state) according to the state data and/or the sensor data (Step 714). If the output of step 714 is YES (i.e., the state data and/or the sensor data indicates the EAC device is in an UNLOCKED state), routine 700 may proceed by executing one or more steps or operations for suppressing a local alarm for the door (Step 720). If the output of step 714 is NO (i.e., the state data and/or the sensor data indicates the EAC device is in a LOCKED state), routine 700 may proceed by executing one or more steps or operations for engaging a local alarm for the door (Step 718). In certain embodiments, step 718 may comprise one or more steps or operations for sending one or more alerts or notifications to one or more client devices to alert one or more end users of a security breach for the door.

Figure 8:
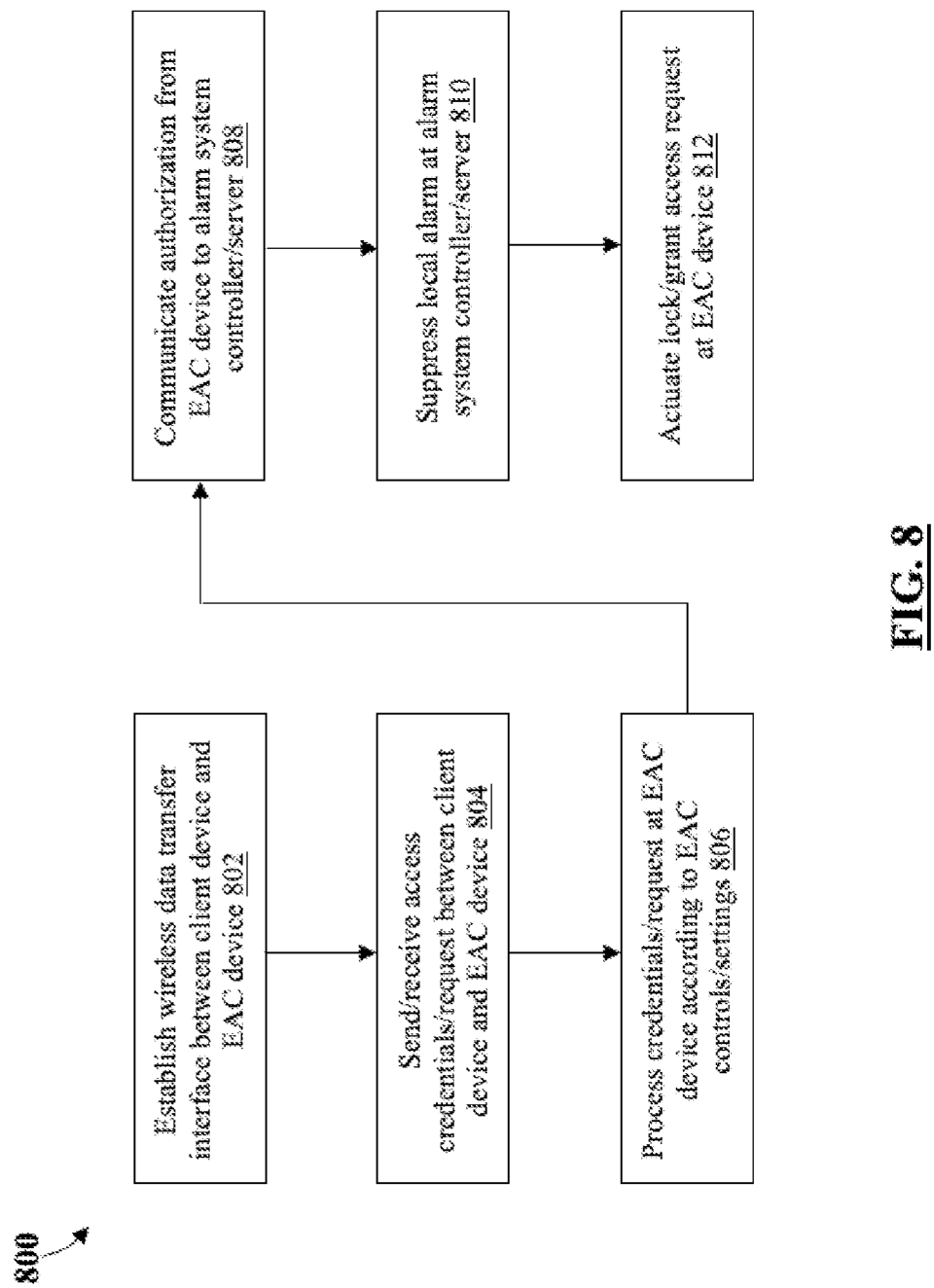
FIG. 8 is process flow diagram of an electronic access control and alarm method, in accordance with certain aspects of the present disclosure.

Referring now to FIG. 8, process flow diagram of an electronic access control and alarm method 800 is shown. In accordance with certain aspects of the present disclosure, method 800 may be embodied within one or more operations and/or system routines within system 100 in FIG. 1. One or more steps or operations of method 800 may be executed across one or more disparate elements of system 100 in FIG. 1 including, but not limited to, client device 110, EAC device 102, alarm system controller 112 and EAC server 114. In accordance with certain aspects of the present disclosure, method 800 may comprise one or more steps or operations for establishing (e.g., via at least one wireless communication protocol) a wireless data transfer interface between a client device (e.g., an end-user device) and an electronic access control (EAC) device (Step 802). Method 800 may proceed by executing one or more steps or operations for sending electronic access code data and/or user credentials from the client device to the EAC device via the wireless data transfer interface and receiving the electronic access code data and/or user credentials at the EAC device (Step 804). The electronic access code data and/or user credentials may comprise an access request from an end user for at least one door or access point within an access-controlled site. Method 800 may proceed by executing one or more steps or operations for processing the electronic access code data and/or user credentials at a controller or the EAC device according to one or more electronic access control settings to verify at least one electronic access code and/or user permission for the EAC device (Step 806). Method 800 may proceed by executing one or more steps or operations for communicating at least one signal from the EAC device to at least one alarm system controller and/or back-end server in response to verifying the at least one electronic access code and/or user permission for the EAC device (Step 808). In accordance with certain embodiments, the at least one signal comprises a command signal for the at least one alarm system controller and/or back-end server to suppress a local alarm for the door or the access point of the enclosure. Method 800 may proceed by executing one or more steps or operations for suppressing (e.g., via the at least one alarm system controller and/or back-end server) the local alarm for the door or the access point of the enclosure in response to receiving/processing the least one signal from the EAC device (Step 810). Method 900 may proceed by executing one or more steps or operations for commanding (e.g., via a controller of the EAC device) at least one electronic actuator of the EAC device to actuate at least one locking mechanism of the EAC device from a LOCKED position to an UNLOCKED position to unlock the door and grant the access request from the end user (Step 812).

In accordance with certain aspects of the present disclosure, method 800 may further comprise executing one or more steps or operations for determining at least one state of the electronic locking device according to a state machine model in response to receiving the electronic access code data from the at least one mobile electronic device. In certain embodiments, method 800 may further comprise executing one or more steps or operations for receiving at least one sensor input from at least one sensor. In certain embodiments, method 800 may further comprise executing one or more steps or operations for determining at least one state of the electronic locking device according to a state machine model in response to the at least one sensor input. In certain embodiments, method 800 may further comprise executing one or more steps or operations for communicating a second signal to the at least one alarm system controller or back-end server in response to determining the at least one state of the electronic locking device. In certain embodiments, the at least one alarm system controller or back-end server is configured to engage the local alarm for the door or the access point of the enclosure in response to the second signal. In certain embodiments, method 800 may further comprise executing one or more steps or operations for transitioning the at least one state of the electronic locking device according to the state machine model in response to the at least one sensor input. In certain embodiments, method 800 may further comprise executing one or more steps or operations for transitioning the at least one state of the electronic locking device according to the state machine model in response to commanding the at least one electronic actuator to actuate the at least one locking mechanism from the LOCKED position to the UNLOCKED position.

Figure 9:
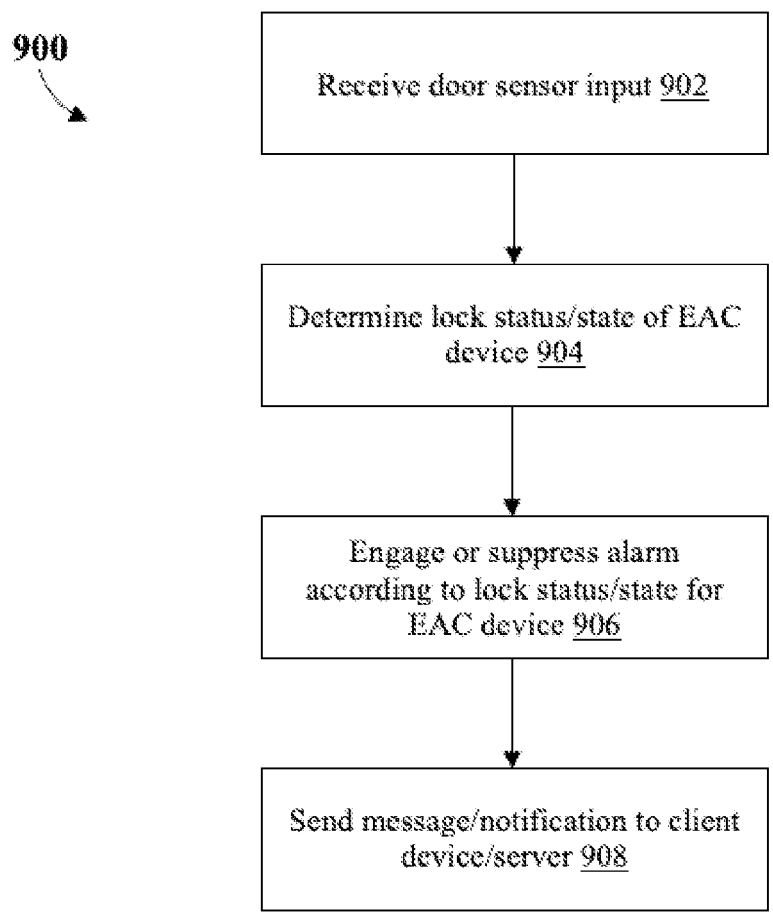
FIG. 9 is a process flow diagram of an electronic access control and alarm method, in accordance with certain aspects of the present disclosure.

Referring now to FIG. 9, a process flow diagram of an electronic access control and alarm method 900 is shown. In accordance with certain aspects of the present disclosure, method 900 may be embodied within one or more operations and/or system routines within system 100 in FIG. 1. One or more steps or operations of method 900 may be executed across one or more disparate elements of system 100 in FIG. 1 including, but not limited to, client device 110, EAC device 102, alarm system controller 112 and EAC server 114. Method 900 may comprise an alternative embodiment to method 800 in FIG. 8 and/or may comprise one or more additional or successive method steps to method 800 in FIG. 8. In accordance with certain aspects of the present disclosure, method 900 may comprise one or more steps or operations for receiving a door sensor input at one or more of an EAC device, an alarm system controller and/or a back-end server (Step 902). In accordance with certain aspects of the present disclosure, the door sensor input may comprise at least one sensor input that indicates at least one door has been opened or is in an open state or position. Method 900 may proceed by executing one or more steps or operations (e.g., with at least one processor of the EAC device, the alarm system controller and/or the back-end server) for determining a current status or state of at least one locking mechanism of the EAC device in response to the door sensor input (Step 904). Method 900 may proceed by executing one or more steps or operations (e.g., with the at least one processor of the EAC device, the alarm system controller and/or the back-end server) for engaging or suppressing at least one local alarm according to the current status or state of the at least one locking mechanism of the EAC device (Step 906). In accordance with certain aspects of the present disclosure, step 906 may comprise one or more steps or operations for suppressing the at least one local alarm in response to determining the current status or state of the at least one locking mechanism of the EAC device comprises an UNLOCKED state. In accordance with certain aspects of the present disclosure, step 906 may comprise one or more steps or operations for engaging the at least one local alarm in response to determining the current status or state of the at least one locking mechanism of the EAC device comprises a LOCKED state. Method 900 may proceed by executing one or more steps or operations for sending (e.g., with the at least one processor of the EAC device, the alarm system controller and/or the back-end server) one or more messages, alerts and/or notifications to one or more client devices and/or server(s) according to an output of step 906 (Step 908).

Figure 10:
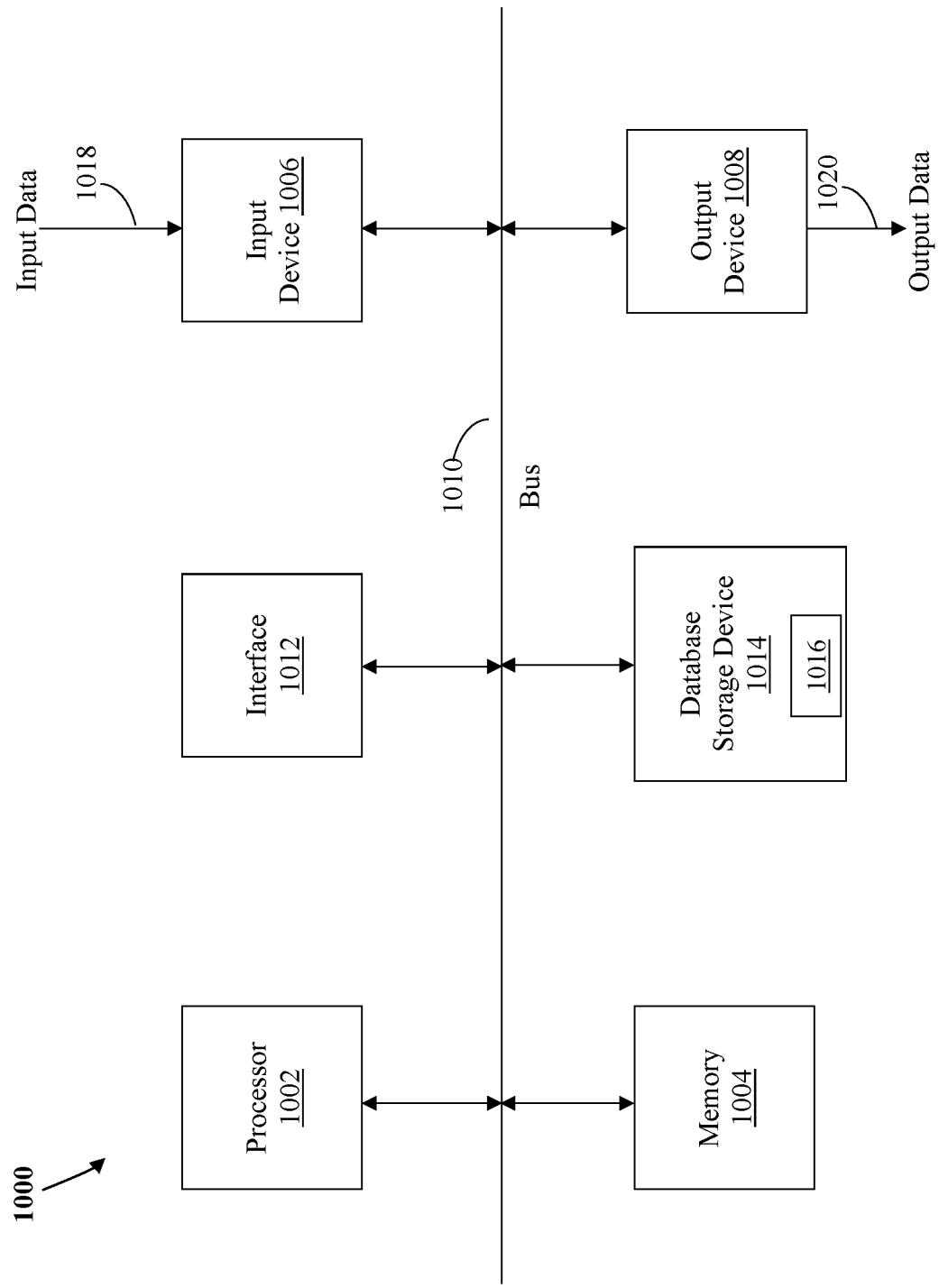
FIG. 10 is an illustrative embodiment of a computing device through which one or more aspects of the present disclosure may be implemented.

Referring now to FIG. 10, a processing system 1000 in which one or more aspects of the present disclosure may be implemented is shown. For example, processing system 1000 may comprise one or more devices and systems of the present disclosure including, but not limited to, one or more mobile electronic device, server, alarm system controller, electronic access controller, electronic access control system interface, and the like. According to an embodiment, processing system 1000 may generally comprise at least one processor 1002, or processing unit or plurality of processors, a memory 1004, at least one input device 1006 and at least one output device 1008, coupled together via a bus or group of buses 1010. In certain embodiments, input device 1006 and output device 1008 could be the same device. An interface 1012 can also be provided for coupling the processing system 1000 to one or more peripheral devices; for example, interface 1012 could be a PCI card or PC card. At least one storage device 1014 which houses at least one database 1016 can also be provided. The memory 1004 can be any form of memory device, for example, volatile or non-volatile memory, solid state storage devices, magnetic devices, etc. The processor 1002 could comprise more than one distinct processing device, for example to handle different functions within the processing system 1000. Input device 1006 receives input data 1018 and can comprise, for example, a keyboard, a pointer device such as a pen-like device or a mouse, audio receiving device for voice-controlled activation such as a microphone, data receiver or antenna (e.g., radio frequency transceiver), a modem or wireless data adaptor, data acquisition card, etc. Input data 1018 could come from different sources, for example keyboard instructions in conjunction with data received via a network. Output device 1008 produces or generates output data 1020 and can comprise, for example, a display device or monitor in which case output data 1020 is visual, a printer in which case output data 1020 is printed, a port for example a USB port, a peripheral component adaptor, a data transmitter or antenna such as a modem or wireless network adaptor, BLUETOOTH, NFC, RFID, LoRA, etc. Output data 1020 could be distinct and derived from different output devices, for example a visual display on a monitor in conjunction with data transmitted to a network. A user could view data output, or an interpretation of the data output, on, for example, a monitor or using a printer. The storage device 1014 can be any form of data or information storage means, for example, volatile or non-volatile memory, solid state storage devices, magnetic devices, etc.

In use, the processing system 1000 is adapted to allow data or information to be stored in and/or retrieved from, via wired or wireless communication means, at least one database 1016. The interface 1012 may allow wired and/or wireless communication between the processing unit 1002 and peripheral components that may serve a specialized purpose. In general, the processor 1002 can receive instructions as input data 1018 via input device 1006 and can display processed results or other output to a user by utilizing output device 1008. More than one input device 1006 and/or output device 1008 can be provided. It should be appreciated that the processing system 1000 may be any form of terminal, server, specialized hardware, or the like.

It is to be appreciated that the processing system 1000 may be a part of a networked communications system. Processing system 1000 could connect to a network, for example the Internet or a WAN. Input data 1018 and output data 1020 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 1000 illustrated in FIG. 10 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 10 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1000 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1000, or portions thereof, may be stored in a remote memory storage device. It is to be appreciated that the illustrated network connections of FIG. 10 are exemplary and other means of establishing a communications link between multiple computers may be used.

FIG. 10 is intended to provide a brief, general description of an illustrative and/or suitable exemplary environment in which embodiments of the below described present invention may be implemented. FIG. 10 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As provided in the foregoing detailed description of the several views of the drawings, certain embodiments have been described with reference to acts and symbolic representations of operations that are performed by one or more computing devices, such as the computing system environment 1000 of FIG. 10. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations, including, but not limited to, those provided herein. Examples of well-known computing systems, environments, and configurations that may be suitable for use with an embodiment include, but are not limited to, smart phones, tablet computers, electronic access control devices, personal computers, handheld or laptop devices, personal digital assistants, multiprocessor systems, microprocessor-based systems, set top boxes, programmable consumer electronics, network, minicomputers, server computers, electronic access control server computers, alarm system server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As will be appreciated by one of skill in the art, one or more aspects of the present disclosure may be embodied as a method (including, for example, a computer-implemented process, a system routine, and/or any other process), an apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the described embodiments can be configured without departing from the scope and spirit of the invention. Therefore, it is to be understood that, within the scope of the appended claims, the invention may be practiced other than as specifically described herein.

What is claimed is:

1. An electronic access control system comprising:
    an electronic locking device configured to selectively secure a door or an access point of an enclosure, the electronic locking device comprising at least one locking mechanism configured to restrict or grant access to the door or the access point of an enclosure;
    a controller operably engaged with the electronic locking device, the controller comprising a wireless communication module configured to establish a wireless data transfer interface with at least one mobile electronic device;
    at least one sensor communicably engaged with the controller, wherein the at least one sensor is configured to detect a position or a movement of the door or the access point of the enclosure;
    at least one alarm system controller or remote server communicably engaged with the at least one sensor and the controller,
    wherein the at least one alarm system controller or remote server is configured to engage or suppress a local alarm for the door or the access point of the enclosure,
    wherein the at least one sensor is configured to communicate sensor input data to the at least one alarm system controller or remote server in response to detecting the position or the movement of the door or the access point of the enclosure,
    wherein the controller comprises at least one processor and a non-transitory computer readable memory device comprising instructions stored thereon that, when executed, command the at least one processor to perform one or more operations, the one or more operations comprising:
        receiving electronic access code data from the at least one mobile electronic device;
        processing the electronic access code data according to one or more electronic access control settings to verify at least one electronic access code for the electronic locking device;
        commanding, in response to successfully verifying the at least one electronic access code, the electronic locking device to actuate at least one locking mechanism of the electronic locking device from a locked state to an unlocked state; and
        communicating a state input for the electronic locking device to the at least one alarm system controller or remote server,
    wherein the at least one alarm system controller or remote server is configured to process the sensor input data and the state input for the electronic locking device according to a state machine model to determine whether to engage or suppress the local alarm,
    wherein the sensor input data comprises a first condition in the state machine model and the state input for the electronic locking device comprises a second condition in the state machine model.

2. The electronic access control system of claim 1 wherein the first condition in the state machine model comprises an open state or a closed state for the door or the access point of the enclosure.

3. The electronic access control system of claim 2 wherein the second condition in the state machine model comprises the locked state or the unlocked state for the electronic locking device.

4. The electronic access control system of claim 3 wherein the state machine model is configured to invoke a first output in response to the first condition comprising an open state for the door or the access point of the enclosure and the second condition comprising an unlocked state for the electronic locking device.

5. The electronic access control system of claim 4 wherein the state machine model is configured to invoke a second output in response to the first condition comprising a closed state for the door or the access point of the enclosure and the second condition comprising a locked state for the electronic locking device.

6. The electronic access control system of claim 4 wherein the at least one alarm system controller or remote server is configured to suppress the local alarm for the door or the access point of the enclosure in response to the first output of the state machine model.

7. The electronic access control system of claim 5 wherein the at least one alarm system controller or remote server is configured to engage the local alarm for the door or the access point of the enclosure in response to the second output of the state machine model.

8. The electronic access control system of claim 5 wherein the state machine model is configured to invoke a third output in response to the first condition comprising the closed state for the door or the access point of the enclosure and the second condition comprising the unlocked state for the electronic locking device.

9. An electronic access control system comprising:
    an electronic locking device configured to selectively secure a door or an access point of an enclosure, the electronic locking device comprising at least one locking mechanism and at least one electronic actuator configured to actuate the at least one locking mechanism between a locked position and an unlocked position;
    a controller communicably engaged with the at least one electronic actuator to command the at least one electronic actuator to perform at least one action, the controller comprising a wireless communication module configured to establish a wireless data transfer interface with at least one mobile electronic device;
    an alarm system controller operably engaged with a local alarm for the door or the access point of the enclosure, wherein the alarm system controller is communicably engaged with the controller via at least one data transfer interface; and at least one sensor communicably engaged with one or both of the controller and the alarm system controller, wherein the at least one sensor is configured to detect a position or a movement of the door or the access point of the enclosure and communicate sensor input data to the alarm system controller, wherein the controller is configured to receive access code data from the at least one mobile electronic device via the wireless data transfer interface and process the access code data according to one or more electronic access control settings to verify at least one electronic access code for the electronic locking device, wherein the controller is configured to communicate a first signal to the alarm system controller in response to successfully verifying the at least one electronic access code, wherein the controller is configured to command the at least one electronic actuator to actuate the at least one locking mechanism from the locked position to the unlocked position in response to communicating the first signal to the alarm system controller and successfully verifying the at least one electronic access code, wherein the alarm system controller is configured to process the sensor input data and the first signal from the controller according to a state machine model to determine whether to engage or suppress the local alarm for the door or the access point of the enclosure, wherein the sensor input data comprises a first condition in the state machine model and the first signal from the controller comprises a second condition in the state machine model.

10. The electronic access control system of claim 9 wherein the at least one sensor is configured to communicate the sensor input data to one or both of the controller and the alarm system controller in response to detecting a change in the position of the door or the access point of the enclosure.

11. The electronic access control system of claim 10 wherein the first condition in the state machine model comprises an open state or a closed state for the door or the access point of the enclosure.

12. The electronic access control system of claim 11 wherein the second condition in the state machine model comprises the locked position or the unlocked position for the at least one locking mechanism.

13. The electronic access control system of claim 12 wherein the state machine model is configured to invoke a first output in response to the first condition comprising the open state for the door or the access point of the enclosure and the second condition comprising the unlocked position for the at least one locking mechanism.

14. The electronic access control system of claim 13 wherein the state machine model is configured to invoke a second output in response to the first condition comprising the closed state for the door or the access point of the enclosure and the second condition comprising the locked position for the at least one locking mechanism.

15. The electronic access control system of claim 14 wherein the alarm system controller is configured to engage the local alarm for the door or the access point of the enclosure in response to the second output of the state machine model and suppress the local alarm for the door or the access point of the enclosure in response to the first output of the state machine model.

16. An electronic access control apparatus comprising:
a lock body configured to be selectively coupled to a surface of a door;
a locking mechanism coupled to the lock body, wherein the locking mechanism is configured to be selectively engaged between a locked position and an unlocked position;
an electronic actuator coupled to the lock body and operably engaged with the locking mechanism to actuate the locking mechanism between the locked position and the unlocked position;
a controller communicably engaged with the electronic actuator to command the electronic actuator to actuate the locking mechanism between the locked position and the unlocked position;
at least one sensor configured to detect a position or a movement of the door; and
at least one alarm system controller or remote server communicably engaged with the at least one sensor and the controller,
wherein the at least one sensor is configured to communicate sensor input data to the at least one alarm system controller or remote server in response to detecting the position or the movement of the door,
wherein the controller comprises at least one processor and a non-transitory computer readable memory device comprising instructions stored thereon that, when executed, command the at least one processor to perform one or more operations, the one or more operations comprising:
  receiving electronic access code data from at least one mobile electronic device via a data transfer interface;
  processing the electronic access code data according to one or more electronic access control settings to verify at least one electronic access code;
  commanding, in response to successfully verifying the at least one electronic access code, the electronic actuator to actuate the locking mechanism from the locked position to the unlocked position; and
  communicating a state input to the at least one alarm system controller or remote server,
wherein the at least one alarm system controller or remote server is configured to process the sensor input data and the state input according to a state machine model to determine whether to engage or suppress a local alarm for the door,
wherein the sensor input data comprises a first condition in the state machine model and the state input comprises a second condition in the state machine model.

17. The electronic access control apparatus of claim 16 wherein the first condition in the state machine model comprises an open state or a closed state for the door.

18. The electronic access control apparatus of claim 17 wherein the second condition in the state machine model comprises the locked position or the unlocked position for the locking mechanism.

19. The electronic access control apparatus of claim 18 wherein the state machine model is configured to invoke a first output in response to the first condition comprising the open state for the door and the second condition comprising the unlocked position for the locking mechanism.

20. The electronic access control apparatus of claim 19 wherein the state machine model is configured to invoke a second output in response to the first condition comprising the closed state for the door and the second condition comprising the locked position for the locking mechanism.

* * * * *